(12) United States Patent
Frederick et al.

(10) Patent No.: US 10,054,933 B2
(45) Date of Patent: Aug. 21, 2018

(54) CONTROLLING DISTRIBUTED DEVICE OPERATIONS

(71) Applicant: Sirqul, Inc., Seattle, WA (US)

(72) Inventors: Robert Frederick, Seattle, WA (US); Michael Sangeun Woo, Kirkland, WA (US); Justin Jaewook Yu, Bellevue, WA (US); Justin Arruda, Wyoming, RI (US); Ryan Azucena, Bellevue, WA (US); John Thomas Hurr, Seattle, WA (US); Matthew Aaron Kleczka, Seattle, WA (US); Russell Brian Dodds, Seattle, WA (US); Chris Gay, Mountlake Terrace, WA (US); Thang Le, Seattle, WA (US)

(73) Assignee: Sirqul, Inc., Seattle, WA (US)

( * ) Notice: Subject to any disclaimer, the term of this patent is extended or adjusted under 35 U.S.C. 154(b) by 0 days.

(21) Appl. No.: 15/809,882

(22) Filed: Nov. 10, 2017

(65) Prior Publication Data
US 2018/0164785 A1    Jun. 14, 2018

Related U.S. Application Data

(63) Continuation-in-part of application No. 14/498,767, which is a continuation of application No.
(Continued)

(51) Int. Cl.
*G05B 11/01* (2006.01)
*G05B 19/418* (2006.01)
(Continued)

(52) U.S. Cl.
CPC ....... *G05B 19/418* (2013.01); *G06Q 20/3224* (2013.01); *H04L 67/025* (2013.01);
(Continued)

(58) Field of Classification Search
CPC ..... G05D 1/0088; B25J 9/0084; B25J 9/1682; B25J 9/1661; B25J 9/1679;
(Continued)

(56) References Cited

U.S. PATENT DOCUMENTS

| | | | | |
|---|---|---|---|---|
| 5,852,724 A | * | 12/1998 | Glenn, II | ............... H04L 29/06 709/239 |
| 5,905,868 A | * | 5/1999 | Baghai | ............... G06F 11/3495 709/201 |

(Continued)

FOREIGN PATENT DOCUMENTS

| | | |
|---|---|---|
| JP | 2001343249 A | 12/2001 |
| JP | 2002056283 A | 2/2002 |

(Continued)

OTHER PUBLICATIONS

BuzzNetworker.com, "Facebook Feature: Sponsored Groups," accessed May 31, 2007, from http://www.buzznetworker.com/facebook-feature-sponsored-groups/, 2 pages.
(Continued)

*Primary Examiner* — Darrin D Dunn
(74) *Attorney, Agent, or Firm* — Seed IP Law Group LLP

(57) ABSTRACT

Techniques are described for controlling distributed operations of devices, such as for devices that are each part of or otherwise associated with a mechanical system containing actuators to manipulate a surrounding environment and optionally further containing sensors to obtain information from the surrounding environment, and with such a device controlling the associated system to perform industrial operations. The described techniques may include identifying a group of multiple such devices to perform one or more assigned tasks, such as in a cooperative distributed manner with each device performing part of the assigned tasks, and/or in a competitive manner with some or all devices independently performing at least one assigned task. The
(Continued)

performances of the devices may further be evaluated in various manners, and the devices selected to perform one or more tasks may be identified in various manners (including based at least in part on past performance evaluations).

30 Claims, 8 Drawing Sheets

Related U.S. Application Data

PCT/US2013/034175, filed on Mar. 27, 2013, now abandoned, and a continuation-in-part of application No. 13/843,804, filed on Mar. 15, 2013, now abandoned.

(60) Provisional application No. 61/616,340, filed on Mar. 27, 2012.

(51) Int. Cl.
  H04W 4/02      (2018.01)
  H04L 29/08     (2006.01)
  G06Q 20/32     (2012.01)
  H04W 84/10     (2009.01)
  H04W 84/04     (2009.01)

(52) U.S. Cl.
  CPC .............. H04W 4/02 (2013.01); H04W 84/04 (2013.01); H04W 84/10 (2013.01)

(58) Field of Classification Search
  CPC .... G05B 19/41865; G05B 2219/39117; G05B 19/4187; G05B 19/41895; G05B 2219/39167; G05B 2219/40095; G05B 2219/40352; G05B 2219/39376; G05B 2219/39377; G05B 2219/39387
  See application file for complete search history.

(56) References Cited

U.S. PATENT DOCUMENTS

| | | | |
|---|---|---|---|
| 6,553,236 B1 | 4/2003 | Dunko et al. | |
| 6,842,460 B1 | 1/2005 | Olkkonen et al. | |
| 6,975,873 B1 | 12/2005 | Banks et al. | |
| 7,120,455 B1 | 10/2006 | Chen et al. | |
| 7,188,177 B2 | 3/2007 | Taylor | |
| 7,206,568 B2 | 4/2007 | Sudit | |
| 7,209,755 B2 | 4/2007 | Gorday et al. | |
| 7,239,871 B2 | 7/2007 | Shamp et al. | |
| 7,314,162 B2 | 1/2008 | Carr et al. | |
| 7,359,724 B2 | 4/2008 | Torvinen | |
| 7,447,508 B1 | 11/2008 | Tendler | |
| 7,457,634 B2 | 11/2008 | Morinaga et al. | |
| 7,747,720 B2* | 6/2010 | Toebes ................ H04L 67/1021 370/401 | |
| 7,769,617 B2* | 8/2010 | Iwasaki .......... G06Q 10/063112 340/521 | |
| 7,890,393 B2 | 2/2011 | Talbert et al. | |
| 8,135,505 B2 | 3/2012 | Vengroff et al. | |
| 8,428,777 B1* | 4/2013 | Poursohi .......... G05B 19/41865 700/247 | |
| 8,795,084 B2 | 8/2014 | Bell et al. | |
| 2002/0019829 A1 | 2/2002 | Shapiro | |
| 2002/0102993 A1 | 8/2002 | Hendrey et al. | |
| 2002/0111173 A1 | 8/2002 | Hendrey et al. | |
| 2002/0164995 A1 | 11/2002 | Brown et al. | |
| 2002/0183072 A1 | 12/2002 | Steinbach et al. | |
| 2003/0003933 A1 | 1/2003 | Deshpande et al. | |
| 2003/0020623 A1 | 1/2003 | Cao et al. | |
| 2003/0083046 A1 | 5/2003 | Mathis | |
| 2003/0096621 A1 | 5/2003 | Jana et al. | |
| 2003/0096628 A1 | 5/2003 | Bar-On et al. | |
| 2003/0100326 A1 | 5/2003 | Grube et al. | |
| 2003/0186716 A1 | 10/2003 | Dorenbosch et al. | |
| 2003/0220114 A1 | 11/2003 | Langensteiner et al. | |
| 2003/0225686 A1 | 12/2003 | Mollett et al. | |
| 2004/0078340 A1 | 4/2004 | Evans | |
| 2004/0111184 A1 | 6/2004 | Chiapetta et al. | |
| 2004/0235568 A1 | 11/2004 | Kim | |
| 2005/0113123 A1 | 5/2005 | Torvinen | |
| 2005/0149443 A1 | 7/2005 | Torvinen | |
| 2005/0210104 A1 | 9/2005 | Torvinen | |
| 2005/0221812 A9 | 10/2005 | Gailey et al. | |
| 2005/0222908 A1 | 10/2005 | Altberg et al. | |
| 2005/0228719 A1 | 10/2005 | Roberts et al. | |
| 2005/0233776 A1 | 10/2005 | Allen et al. | |
| 2005/0239495 A1 | 10/2005 | Bayne | |
| 2005/0245241 A1 | 11/2005 | Durand et al. | |
| 2006/0004627 A1 | 1/2006 | Baluja | |
| 2006/0153346 A1 | 7/2006 | Gonen et al. | |
| 2006/0155406 A1* | 7/2006 | Rossi ............... G05B 19/41865 700/99 | |
| 2007/0262855 A1 | 11/2007 | Zuta et al. | |
| 2008/0109114 A1* | 5/2008 | Orita ...................... B25J 19/005 700/248 | |
| 2008/0156869 A1 | 7/2008 | Carr et al. | |
| 2008/0280624 A1 | 11/2008 | Wrappe | |
| 2009/0017913 A1 | 1/2009 | Bell et al. | |
| 2009/0125396 A1 | 5/2009 | Otto et al. | |
| 2009/0203361 A1 | 8/2009 | Huang et al. | |
| 2009/0312946 A1 | 12/2009 | Yoshioka et al. | |
| 2010/0174582 A1 | 7/2010 | Makowka et al. | |
| 2010/0174593 A1 | 7/2010 | Cao et al. | |
| 2010/0205299 A1* | 8/2010 | Nagarajrao ........... H04L 41/046 709/224 | |
| 2010/0286824 A1* | 11/2010 | Solomon ................. F41H 13/00 700/248 | |
| 2011/0159964 A1 | 6/2011 | Schiappa et al. | |
| 2011/0223895 A1 | 9/2011 | Wagda et al. | |
| 2012/0126021 A1* | 5/2012 | Warren ................ F24F 11/0012 236/1 C | |
| 2012/0318879 A1* | 12/2012 | Babich ............... G05D 23/1902 236/51 | |
| 2013/0217421 A1* | 8/2013 | Kim ......................... H04B 1/38 455/456.3 | |
| 2013/0312000 A1* | 11/2013 | Helander .............. G06F 9/4887 718/104 | |
| 2016/0354923 A1* | 12/2016 | Kuffner, Jr. ............ B25J 9/0084 | |

FOREIGN PATENT DOCUMENTS

| | | | | |
|---|---|---|---|---|
| JP | 2003006509 A | 1/2003 | | |
| JP | 2003196535 A | 7/2003 | | |
| JP | 2003346052 A | 12/2003 | | |
| JP | 2005050222 A | 2/2005 | | |
| JP | 2005115945 A | 4/2005 | | |
| JP | 2005327073 A | 11/2005 | | |
| KR | 10-2006-0105905 A | 10/2006 | | |
| TW | 200935871 A | 8/2009 | | |
| TW | M377633 U1 | 4/2010 | | |
| TW | 201131494 A | 9/2011 | | |
| WO | WO-2009040777 A2 * | 4/2009 | ............. G06N 3/008 | |

OTHER PUBLICATIONS

Classmates.com, "About Classmates Online, Inc.," accessed May 31, 2007, from http://www.classmates.com/cmo/about/index.jsp, 1 page.
Classmates.com, "Welcome to Help Center," accessed May 31, 2007, from http://www.classmates.com/cmo/help/index.jsp, 1 page.
Facebook.com, "About Facebook," accessed May 31, 2007, from http://www.facebook.com/about.php, 1 page.
Hafner, K., "Navigating the Amazon Circle," May 21, 2000, The New York Times, accessed May 31, 2007, from http://www.marcusbukingham.com/press/newPress/articles/NewYorkTimes/navAmazon.php?me . . . , 3 pages.
Kim, R., "Find Friends by Cell Phone: Loopt application's GPS program can beam map location," Nov. 14, 2006, SFGate.com, accessed May 31, 2007, from http://www.sfgate.com/cgi-bin/ar-

(56) References Cited

OTHER PUBLICATIONS ticle.cgi?file=/c/a/2006/11/14/BUGMMMC1KE1.DTL&type= pr . . . , 2 pages.
Mullaney, T., "Online Shopping: Bargaining Power," Dec. 13, 1999, Businessweek Online, accessed May 31, 2007, from http://businessweek.com/1999/99_50/b3659033.htm?scriptFramed, 3 pages.
MySpace.com, "About Us," accessed May 31, 2007, from http://www.myspace.com/Modules/Common/Pages/AboutUs.aspx, 1 page.
MySpace.com, "Take the MySpace Tour!," accessed May 31, 2007, from http://collect.myspace.com/misc/tour_1.html, 6 pages.
T-Mobile, "Unlimited Cell Phone Calls to Your Five Favorite People—myFaves From T-Mobile," accessed May 31, 2007, from http://www.myfaves.com/what-is-myfaves.html, 1 page.
Clarke, R., "Person-Location and Person-Tracking: Technologies, Risks and Policy Implications," Dec. 13, 2000, retrieved on Apr. 27, 2008, from http://www.anu.edu.au/people/Roger.Clarke/DV/PLT.html, 24 pages.

\* cited by examiner

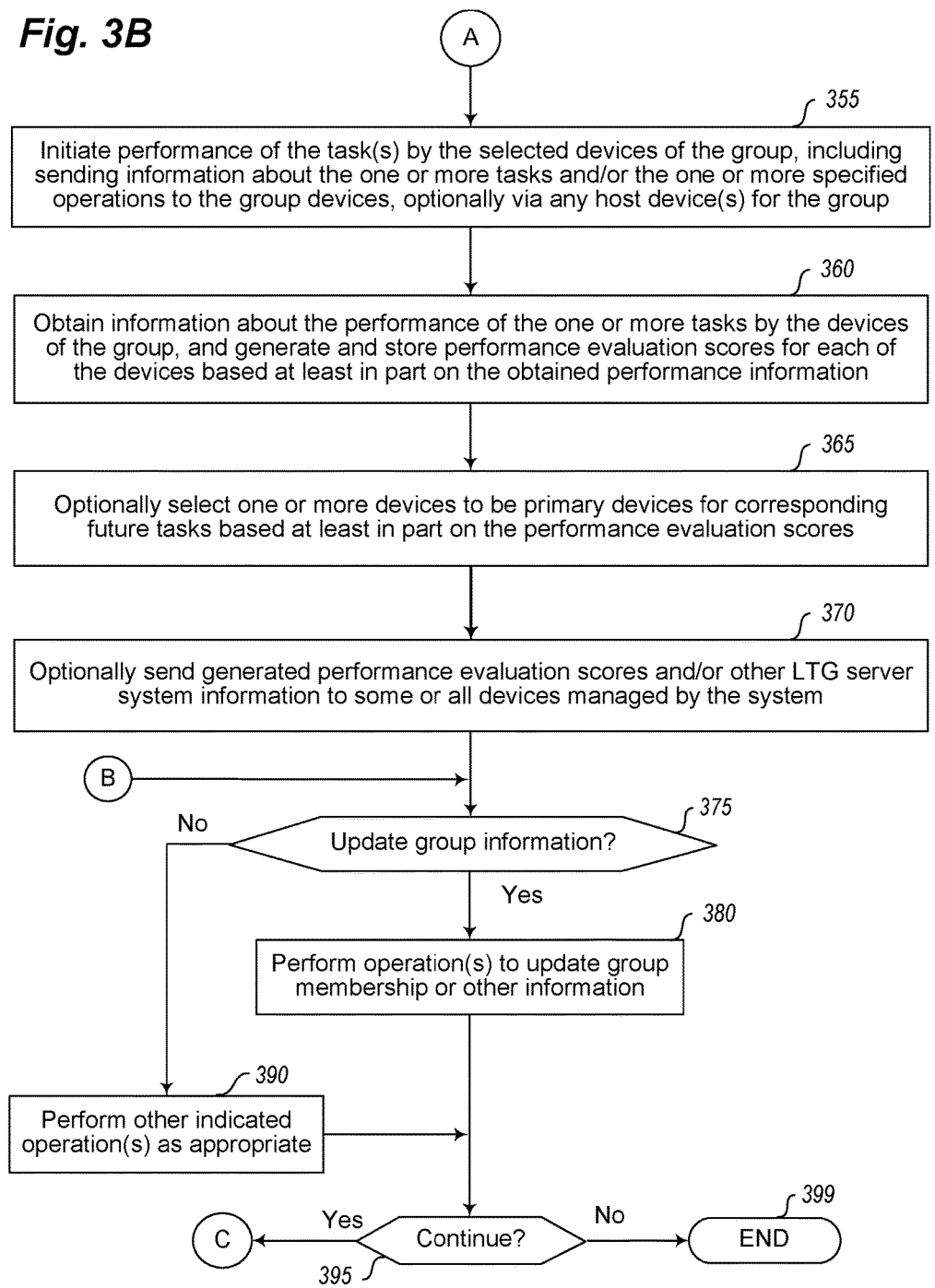

CONTROLLING DISTRIBUTED DEVICE OPERATIONS

CROSS-REFERENCE TO RELATED APPLICATIONS

This application is a continuation-in-part of U.S. patent application Ser. No. 14/498,767, filed Sep. 26, 2014 and entitled "Location-Based Task And Game Functionality". U.S. patent application Ser. No. 14/498,767 is a continuation of International Application No. PCT/US2013/034175, filed Mar. 27, 2013 and entitled "Location-Based Task And Game Functionality"; and is also a continuation-in-part of U.S. patent application Ser. No. 13/843,804, filed Mar. 15, 2013 and entitled "Location-Based Task And Game Functionality". U.S. patent application Ser. No. 13/843,804 claims the benefit of U.S. Provisional Patent Application No. 61/616,340, filed Mar. 27, 2012 and entitled "Location-Based Task And Game Functionality,"

TECHNICAL FIELD

The following disclosure relates generally to techniques for controlling distributed operations of devices, such as to control performance of an assigned task by devices of a group that manage one or more associated mechanical systems.

BACKGROUND

Devices to control industrial operations and perform other activities are increasingly interconnected, including via wireless communications. However, while the capability to provide instructions to control device operations from remote locations may provide the opportunity to increase effectiveness of the devices in some situations, problems exist with such remote operations control, including in managing groups of devices available to perform particular tasks.

BRIEF DESCRIPTION OF THE DRAWINGS

FIGS. 3A-3B are a flow diagram of an example embodiment of a Location-based Task Governor (LTG) Server routine.

DETAILED DESCRIPTION

Figure 1A:
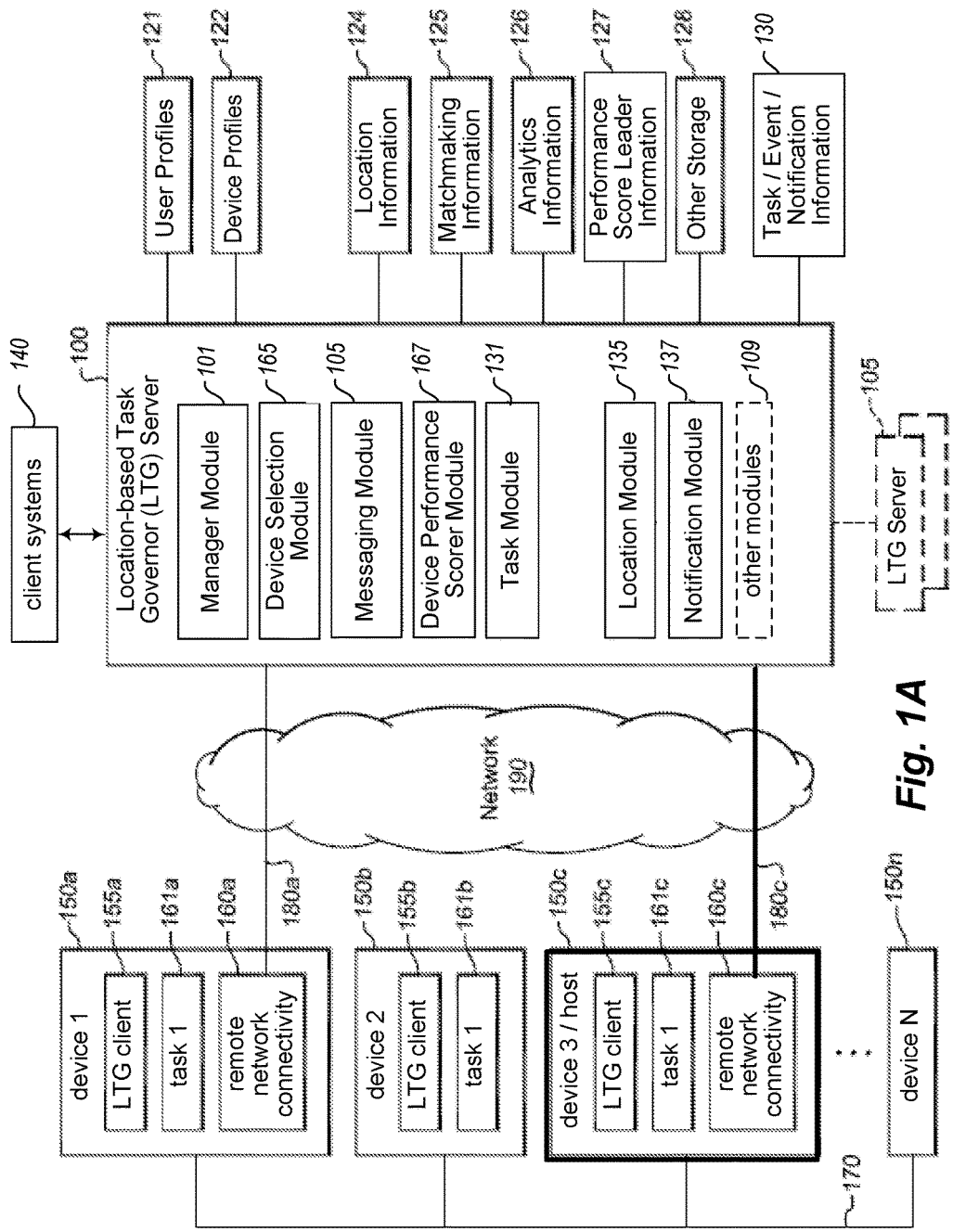
FIGS. 1A-1E are network diagrams illustrating example embodiments of interactions that involve controlling performance of assigned task(s) by devices of a group.

Techniques are described for controlling distributed operations of devices. In at least some embodiments, the devices are each part of or otherwise associated with a mechanical system that contains one or more actuators to manipulate a surrounding environment and that may further contain one or more sensors to obtain information from the surrounding environment, such as for a device to control the associated system to perform industrial operations in at least some embodiments—as non-exclusive examples, the devices may be part of or otherwise associated with environmental controls for a building (e.g., as part of one or more HVAC, or heating, ventilation and air conditioning, units), or may be part of or otherwise associated with industrial robots or other mobile robotic systems that maneuver in a surrounding environment and/or manipulate surrounding objects. In addition, the described techniques may include identifying a group of multiple such devices to perform one or more assigned tasks, such as in a cooperative distributed manner in which each device of the group performs part of the one or more assigned tasks, and/or in a competitive manner in which some or all devices of the group independently perform at least one assigned task. The performances of the devices may further be evaluated in various manners, and the devices selected to perform one or more tasks may be identified in various manners (including based at least in part on past performance evaluations), as discussed in greater detail below. In at least some embodiments, some or all of the described techniques are performed by automated operations of a computer-implemented Location-based Task Governor ("LTG") server system, as discussed further below.

As noted above, a group of devices may be assigned one or more tasks to be performed, such as by controlling mechanical systems or other systems associated with the devices. Such tasks may be of various types that correspond to the associated mechanical systems or other systems—as non-exclusive examples, tasks for one or more associated HVAC systems may include setting and maintaining specified environment conditions (e.g., temperature), and tasks for one or more associated mobile robotic systems may include moving to locations of indicated physical objects and manipulating them in specified manners. More generally, other tasks for devices and/or their associated systems may include identifying a location of a particular device or other object (e.g., based on which of multiple devices in a group have strongest signal strength in a wireless connection to the particular device, which of multiple camera systems or other sensor systems can sense the particular device or other object, etc.), providing network connectivity to a particular device, providing a mesh of network connectivity and/or other functionality over a specified area, obtaining sensor information of a specified type in one or more specified locations, etc. Furthermore, performance of a task by a device may include the device implementing one or more specified types of operations (e.g., communicating with an associated system in a particular manner, performing a specified activity provided by the device, etc.), such as with the LTG server system determining the one or more specified types of operations for the task and instructing the device to implement those types of operations, or with the LTG server system assigning the task to the device and having the device determine the one or more specified types of operations to implement.

In addition, the performance of a device in completing one or more tasks (or in implementing one or more specified types of operations associated with one or more tasks) may be evaluated in various manners in various embodiments, including based on one or more specified criteria (e.g., the same criteria for all tasks/operations; task-specific and/or operation-specific criteria, such as may be specified by a client of the LTG server system that requests the task performance; etc.). Non-exclusive examples of criteria for evaluation may include one or more of the following: how quickly a task or operation is performed; if a task or operation is completed by a specified completion time; if a task or operation is successfully completed; using accuracy or other quality of results generated from task or operation completion; etc. Furthermore, evaluation of a device's performance may further be based at least in part on performance of other devices in a common group, such as in comparison to the other devices in situations involving competitive task performance (e.g., a relative ranking compared to the other devices), and/or in combination with the other devices in situations involving cooperative task performance (e.g., based at least in part on how the overall group cooperatively accomplished one or more assigned tasks, on how the device contributed to the overall group performance, etc.). In addition, when multiple inter-related tasks are performed in part or in whole by a device, the evaluation of the device's performance may be based on performance of the multiple inter-related tasks, including how well dependencies and other relationships between the multiple tasks are managed. Furthermore, information about a device's task or operation performance activities may be provided to the LTG server system (and/or to other devices) in various manners in various embodiments, including for the device to push some or all such information to the LTG server system or other devices (e.g., periodically, upon completion of performance of a task or operation, when other criteria are satisfied, etc.), and/or for some or all such information to be pulled by the LTG server system or other devices (e.g., for the device to respond to received requests for particular task or operation performance information and/or other information about the device, such as a current workload, location, etc.).

A device may further be selected or identified to perform a task in various manners in various embodiments, including based on the device being part of a group of devices to perform one or more such tasks and/or based on the device being available to join such a group. Various factors may be used in such device selection, including one or more of the following non-exclusive example factors, and optionally by using weighting to combine multiple such factors: a current performance evaluation score and/or past performance evaluation scores for the device (whether for any tasks/operations, or for other tasks/operations of the same or similar types); a current and/or past and/or expected future location of the device; a current and/or past workload of a device (e.g., in performing other tasks or activities); priority of a task to be assigned, optionally relative to priorities of other tasks currently being performed or scheduled to be performed by the device; an ability to perform a task to be assigned by a specified completion time in combination with one or more other related tasks that have a defined order or other dependencies; current and/or scheduled maintenance on a device; etc. Furthermore, one or more devices may be selected to be the primary devices based on their evaluated performance scores, such as for one or more of a type of operation or particular operation, type of task or particular task, geographical location, etc.—if so, the primary devices may be selected in the future for corresponding tasks to be performed, whether exclusively (by excluding other non-primary devices for such tasks) or by giving a preference to the primary devices (e.g., to use the primary devices if they are available, but to otherwise select other devices).

Furthermore, in at least some embodiments and situations, a task to be performed by a group of devices may be part of multiple inter-related tasks, such as with dependencies between at least some of the tasks (e.g., a defined order; some tasks depending on the output from other tasks or the completion of other tasks, etc.). If so, the multiple tasks may be performed in various manners (e.g., different devices of the group performing different tasks, such as based on different capabilities of the different devices and/or different availability of the difference devices; each of the devices of the group performing all of the multiple tasks; etc.). Furthermore, the performance of the task by a device of the group may be evaluated based in whole or in part on the performance of the multiple tasks, whether relative to other devices of the group or in combination with the other devices, as discussed in greater detail herein.

The LTG server system may further provide various functionality as part of the described techniques. Such functionality may include tracking locations of devices (e.g., to determine when a device's location may satisfy a task to be performed), providing notifications to particular devices having associated users (e.g., notifications related to particular tasks), etc. Such functionality may further include enabling clients of the LTG server system to define or otherwise specify tasks to be performed in various manners, including to optionally specify various types of associated information (e.g., task priority, task location, task completion time deadline, other related tasks and inter-dependencies between the tasks, etc.). Additional details are included below regarding the described techniques.

For illustrative purposes, some embodiments are described in which particular types of functionality are provided to groups of mobile devices in particular manners. These examples are provided for illustrative purposes and are simplified for the sake of brevity, and the inventive techniques can be used in a wide variety of other situations, some of which are discussed below, including in some embodiments in which some or all of the members of a group are not mobile devices or otherwise differ from the example in one or more manners.

FIG. 1A is a network diagram illustrating an example embodiment of interactions that involve controlling performance of assigned task(s) by devices of a group. In particular, in the example of FIG. 1A, a Location-based Task Governor ("LTG") server program 100 is executing on one or more configured computing systems (not shown), in order to provide functionality to various devices 150. The illustrated example of the LTG server 100 includes various software modules 101, 105, 109, 131, 135, 137, 165 and 167 and uses various information 121-122, 124-128 and 130, as discussed in further detail below. The LTG server 100 may also optionally interact with one or more other LTG server programs 105, such as over one or more networks (not shown), and with such optional other LTG server programs 105 providing similar types of functionality to other devices (not shown). As discussed below, in some embodiments and situations, some or all of the functionality of the LTG server 100 is instead provided locally to a group of devices by one or some or all of those devices, such as by using LTG client software 155 and corresponding locally stored information (not shown) on those devices.

In the example of FIG. 1A, various clients of the LTG server 100 (e.g., executing application programs, users, etc.) may use client computing systems 140 to interact with the LTG server 100 (e.g., over one or more networks, not shown) to specify various types of information to the LTG server 100, including information about tasks to be performed by devices 150 controlled or otherwise managed by the LTG server 100. For example, the clients using the client computing systems 140 may interact with executing Task module 131 to specify various types of tasks to occur, with corresponding task-related information 130 being stored and used by the LTG server 100. The LTG server 100 may also monitor particular devices (e.g., by the Location module 135, which tracks device locations) and provide notifications and functionality corresponding to defined tasks, as discussed further herein.

In the example of FIG. 1A, the LTG server 100 is further providing functionality to an example group of multiple client devices 150 that are controlled or otherwise managed by the LTG server 100, such as with respect to distributed execution of an example task (in this example referred to as "task 1")—an embodiment of such a LTG server 100 may further be supporting other groups of devices with respect to the same or other tasks, although such other groups are not illustrated with respect to FIG. 1A. In this example of FIG. 1A, each device 150 includes a copy 161 of at least some of the task 1 information, although in other embodiments may access task information that is stored by the LTG server 100 and/or by another device 150—for example, device 1 150a includes a copy 161a of task 1 information (the copy of task 1 for client device N 150n is not shown in this example). In addition, each device 150 includes a copy 155 of client software for the LTG server 100, as discussed in greater detail below—for example, device 1 includes a copy 155a of the LTG client software (the copy of the LTG client for client device N 150n is not shown). As discussed below, in some embodiments and situations, some or all of the functionality of the LTG server 100 is instead provided locally to a group of devices by one or some or all of those devices, such as by using the LTG client software 155 and corresponding locally stored information (not shown) on those devices. In addition, some or all of the devices 150 may further include copies of information about other tasks, although such other tasks are not illustrated on the devices 150.

In this example, the devices 150 are inter-connected as a group to perform task 1, such as in a coordinated and distributed manner using one or more inter-connections 170 between the various devices 150. In particular, as discussed in greater detail elsewhere, including with respect to FIGS. 1D-1E, each device 150 may be currently connected to at least one other device 150 via one or more connections, with some devices being connected to multiple other devices (e.g., device 3 150c may be connected in a 1-to-1 manner to device N 150n via a first connection, and may separately be connected to both device 1 and device 2 150b via a distinct second connection). Thus, each of the devices 150 includes one or more types of connection capabilities, although local connection capability types (e.g., Bluetooth, Wi-Fi, infrared, wired Ethernet, etc.) are not separately shown in this example. In addition, devices 1 and 3 each includes capabilities 160 to remotely connect to the LTG server 100 (e.g., 3G wireless, 4G wireless, etc.) via remote connections 180 over one or more networks 190, such as the Internet, one or more cellular networks, etc. While not illustrated in this example, in some situations, some or all devices 150 of the group may be connected to one or more other devices 150 of the group via only remote connections 180 (e.g., if device 1 was not connected directly to any other device 150, and instead was only indirectly connected to client device 3 via remote connections 180a and 180c via the LTG server 100), including to optionally have one or more other devices (not shown) that are part of the group but are separated from the illustrated devices 150 via one or more networks 190. Alternatively, in embodiments and situations in which some or all of the functionality of the LTG server 100 is instead provided locally to a group of devices by one or some or all of those devices, the network 190 and any remote connections 180 may not be present or used. Additionally, in some embodiments, one or more of the client devices 150 may be mobile (e.g., part of a mobile robotic system, a smart phone, etc.) or may not be mobile (e.g., a desktop computer) and/or may be connected to one or more other client devices 150 via a wired connection.

In at least some embodiments, the client devices are controller devices that are designed or configured to control or otherwise manage one or more associated systems (e.g., a mechanical system that the controller device is attached to or otherwise part of), but in other embodiments may be of other types that include, for example, a smart phone or other cellular phone, a tablet computer, a desktop computer, a PDA ("personal digital assistant"), a laptop or netbook or notebook computer, etc. A non-exclusive list of example types of devices includes the following: an iPhone, an iPad, an iPod Touch, an Android OS ("operating system") device, a Windows Phone OS device, a Kindle Fire device, a Nintendo DS device, a portable Sony PlayStation device, etc. In certain embodiments, the client devices may be GPS-enabled devices containing GPS receivers, and/or may include other location-aware technology such as Wi-Fi location services. Moreover, in at least some embodiments, a particular client device may store various information (whether in a volatile or non-volatile manner), such as relating to the location of the device, including the current location of the device, the location history of the device over a certain period of time, a record of particular Wi-Fi networks with which the device has communicated or which have been available for communication, information about one or more current and/or prior evaluated performance scores from the LTG server system 100, etc. In addition, various information may be stored from the LTG server system 100 operations, including for some or all other devices (e.g., to enable all devices to have information about performance scores of all devices, about all tasks, etc.).

In the example embodiment, the LTG client software 155 on the devices 150 may include at least a subset of the LTG server 100 functionality (e.g., may include local copies of some or all of the modules 101-167), although in other embodiments the LTG client software 155 may instead lack some or all such modules and instead enable interactions between a device 150 and the LTG server 100 so that the modules that are part of the LTG server 100 may provide functionality to the device 150 as appropriate. In addition, a particular device may store some or all of the information 121-130 locally to the device, including information specific to the device and its one or more tasks.

Automated matchmaking operations may be performed to select a host device 150 to provide a connection to the LTG server 100 in some embodiments and situations, whether operations that are performed in whole or in part by a LTG server 100 that is remote from the devices 150 and/or operations that are performed in whole or in part by one or more of the devices 150 that are providing functionality of the LTG server 100 using LTG client software 155. For example, the LTG client software 155a on device 1 may have previously established remote connection 180a with the LTG server 100, and/or the LTG client software 155c on device 3 may have previously established remote connection 180c with the LTG server 100, and if so the manager module 101 of the LTG server 100 may perform the automated matchmaking operations. In particular, in this example the device 1 and device 3 may be candidates to serve as a current host for the group based on their respective remote network connectivity capabilities 160, optionally along with one or more other devices 4 through N−1 (not shown), and thus the matchmaking operations may select one of those candidate devices, with device 1 illustrated in this example as being selected as an initial host device for the group of devices 150a-150n. After the selection is made, the LTG server may notify the LTG client software 155 on one or more of the devices of the group (e.g., the LTG client software 155 on the selected host), and the LTG client software 155 on the selected host may perform further operations to convey task-specific information and/or other information between the LTG server 100 and the devices of the group. Such information may in some situations include information from other storage 128, such as task-specific content to be provided to devices, task-specific data generated by devices, other task-specific state for particular tasks and groups, etc. Other storage 128 may further store other types of information, including information specific to particular devices and/or their users (for devices having associated users, if any), available types of content (e.g., audio clips or files, video files, images, etc.); etc.

In other embodiments, if no remote connections 180 between the devices of the group and the LTG server 100 exist at a time of performing automated matchmaking operations, or based on other configuration of the LTG client software 155 on one or more of the devices of the group, the LTG client software 155 on one or more of the devices of the group may instead perform such automated matchmaking operations, such as temporarily until the LTG server 100 is available to make a regular host selection, or instead in place of the LTG server 100. Such client-side automated matchmaking operations may include, for example, using locally stored information (not shown) on one or some or all of the devices 150 of the group, such as to correspond to some or all of the information 121-130—since such locally stored information may be less complete in at least some respects than information available to the LTG server 100 (e.g., lack some of the most recent information), a host selection made locally by the LTG client software 155 may be temporary until the LTG server 100 is available to make a selection based on other such information 121-130. Such client-side automated matchmaking operations may further include, for example, one of the LTG client software copies performing the operations (e.g., after being elected by other LTG client software copies as a current host, or otherwise being selected or configured to act as a current host), or by multiple of the LTG client software copies performing the operations in a distributed manner (e.g., using a voting protocol). During times when no remote connections 180 between the devices of the group and the LTG server 100 exist, the LTG client software 155 may nonetheless continue to provide at least some functionality to the group related to performance of task 1 (e.g., using task information 161), and may further locally store information on one or more of the devices 150 about output generated, activities performed and other current status information—if so, when a host (or optionally other member of the group) is later able to establish a remote connection 180 to the LTG server 100, some or all such locally stored information may be sent to the LTG server 100 to enable update of the information 121-130. As one example, information about performance of particular devices for the task 1 (and/or for other previous tasks) may be used and stored as part of leader information 127, such as after corresponding performance scores are generated by the Device Performance Scorer module 167 of the LTG server (whether the module on server 100 and/or on one or more devices 150). In other embodiments, no remote LTG server 100 may be provided, and all functionality of the LTG server 100 may instead be provided by the devices of the group using the LTG client software 155.

As previously noted, functionality of the LTG server 100 (whether provided via one or more remote computing systems and/or by the devices of the group) may use various types of information when performing automated matchmaking operations. For example, the LTG server 100 may have stored various information 121-130 regarding the devices 150, their locations and the task in use, such as based on previous registration activities and/or interactions with the LTG server 100, and may use such information as part of performing the automated matchmaking operations. Such information may be stored in, for example, one or more of the following: device profile information 122 (e.g., device hardware type; device OS type; device software, such as application programs, libraries, utilities, etc.; device capabilities, such as connection type(s), processing power, memory amount and type, storage amount and type, etc.; device status, such as current battery level and connection strength; associated systems and their capabilities; etc.); user profile information 121 for devices (if any) having associated users (e.g., account information; activity patterns; user preferences, such as whether the user is willing to allow his or her device to serve as a host or otherwise be part of a group; social network information, such as information about friends and followers; prior activities of the user, such as related to participating in prior task performance; etc.); location information 124 (e.g., current location, such as expressed in latitude and longitude and optionally bearing or heading and optionally altitude; a history of past locations, such as to reflect a previously traveled path; etc.); etc. In addition, in at least some embodiments, the LTG server 100 may gather some or all such information to be used in automated matchmaking operations and include it as part of separate matchmaking information 125, such as to facilitate rapid access to particular information of use, to track current hosts that have been selected, to track previous hosts that have been selected, to track current alternative candidates for hosts for particular groups, etc.)—the matchmaking information 125 may further include additional information specific to the automated matchmaking operations, such as information about particular factors that are configured to be used (e.g., for all groups and tasks, for particular tasks, for particular groups, etc.), information about how to combine particular factors (e.g., ways to weight or otherwise combine information), information about when to perform automated matchmaking operations (e.g., upon request, upon a change in a currently selected host that prevents that device from continuing to act as a host, upon other defined criteria, etc.), etc., and with particular such information being specified for a task by a task provider and/or by a distinct operator of the LTG server 100 functionality, or being specified for multiple tasks (e.g., all tasks) by a distinct operator of the LTG server 100 functionality. As one specific example in which a group of multiple devices selects a host device without using a remote LTG server 100, the selection may be made without consideration of any remote connections by the devices to remote server computing systems and/or without consideration of remote network connectivity capabilities—instead, the selection may be made by one or more of the devices based on one or more of the following types of factors: capabilities of the selected host device (e.g., processing speed, network transmission speed to other devices of the group via local inter-connections, etc.); information about the selected host device relative to other devices of the group (e.g., relative location, such as to select a centrally located device based on distance to other of the devices; orientation; etc.); information about a user of the selected host device (e.g., willingness of the user to use the device to act as the host; past behavior of the user in remaining as a host until an task is completed or otherwise remaining in groups for long or short periods of time; etc.); information about previous device performance (e.g., a preferred status of the device based on one or more previous evaluated performance scores for a device, such as to enable devices who have reached a preferred status or level from previous performance to have the first opportunity to act as a host and receive corresponding benefits that are provided; etc.); etc. In other situations, some or all of these types of factors may instead be considered in situations in which a remote LTG server 100 is used and/or the host selection is made based in part on consideration of remote connections by the devices to remote server computing systems and/or of corresponding remote network connectivity capabilities.

In some embodiments and situations, the automated matchmaking operations may further use analytics information, which includes information of various types—at least some of the information may correspond to or reference, for example, user profiles 121, device profiles 122 and location information 124. For example, task information may include a variety of types of events (e.g., task start, task end, task phase or stage start or end, particular device action, particular group achievement, etc.). The automated matchmaking operations may further include matching particular devices to defined tasks in particular manners, as discussed in greater detail elsewhere. In addition, the various modules of the LTG server system may perform various analyses of the analytics information, such as to perform data mining or otherwise determine patterns from or other aggregations of multiple events, and resulting information that is generated may be stored in various manners (e.g., in other storage 128, as other analytics information 126, etc.). A non-exclusive list of types of information that may be stored for one or more tasks includes the following: a particular activity; one or more devices (e.g., via a unique device ID), such to enable corresponding information to be accessed from the device profiles 122; a location (e.g., via a set of location coordinates or other information that uniquely identifies a location), such to optionally enable corresponding information to be accessed from the location information 124; a state of the task (e.g., a current stage, level, group score, etc.); one or more task-specific tags (e.g., text or other information); and other task information 130 that may include one or more of a specified task priority, a specified task completion time (e.g., based on a specific time and/or a specified length of time of task performance), other related tasks and dependencies between the tasks (e.g., the output of a first task is used as input to a second task, or other dependency information such that some tasks are to be started and/or completed before other tasks are started and/or completed), etc.

In the illustrated example, the initial host selection for the group may include, for example, selecting device 3 to act as the host, such as to use remote connection 180c to provide task performance-related capabilities to other devices of the group from one or more remote computing systems. The initial host selection may be made, for example, based on one or more of the following factors: remote connection 180c being preferred to remote connection 180a, such as based on it having higher bandwidth, lower latency, lower monetary cost of use, greater reliability or stability (e.g., less likely to have lost packets or dropped connections), etc.; device 3 being preferred to device 1, such as based on it having faster computing capabilities and/or greater computing-related resources, greater reliability or stability (e.g., less likely to fail; more likely to operate longer, such as based on battery life remaining; etc.), etc.; a user of device 3 being preferred to a user of device 1, such as based on being expected to remain as part of the group for longer; etc. If device 3 is selected as the initial host, but later it is determined to change hosts (e.g., based on device 3 shutting down or leaving the group), device 1 may be selected at that time to replace device 3 as the current host, such as based on device 1 being the only remaining group device with a remote connection 180 to the LTG server 100 and/or other remote computing systems, or based on performing the same type of selection process as for the initial selection between multiple candidate hosts. Additional details related to changing hosts are discussed with respect to FIGS. 1D-1E.

In addition, one or more devices may be selected for a group to perform one or more tasks in various manners in various embodiments, such as by a Device Selection module 165 of the LTG server system. For example, a particular device and a particular group may be matched (e.g., if multiple alternative groups are available for that device and/or multiple alternative devices are available for that group) based on consideration of one or more factors that may include some or all of the same factors as discussed above with respect to host selection. Furthermore, in some embodiments, such matching may be performed to increase or decrease diversity of particular types of devices and/or device capabilities within a group, such as to combine multiple devices of the same or similar types (e.g., devices that have the same or similar capabilities) or to use devices of different types in a competitive manner to compare performance of the different devices for one or more tasks, and/or to provide a group with a device having preferred capabilities (e.g., to add a device having remote network capabilities to a group that lacks such capabilities in some or all of its current members). In other embodiments, such matching may be based in part or in whole based on one or more defined tasks, such as if a group of devices are interacting with respect to performing a particular defined task (e.g., were selected for such participation), or are otherwise each participating (e.g., without inter-device interaction) in performing a particular defined task, while in other embodiments and situations a group of devices may be performed before particular tasks are available to be performed that are later assigned to that group. In addition, factors that may be used in selecting a device to perform a task or in otherwise assigning a device to a group may include one or more of the following: a current and/or past workload of a device (e.g., in performing tasks or from other activities), such as to reflect an ability of the device to complete performance of a task by a specified completion time; priorities of a new task to be assigned and/or any other tasks currently being performed or scheduled to be performed by the device, such as to reflect an ability of the device to complete performance of a task by a specified completion time (e.g., by performing the new task before one or more other lower-priority tasks that are currently being performed or scheduled to be performed by the device); current and/or past performance scores of a device, such as to assign any task or a task with a priority above a specified threshold to one or more devices that have the highest evaluated performance scores or that have scores about a defined threshold; an ability to perform a new task to be assigned by a specified completion time in combination with one or more other related tasks that have a defined order or other dependencies; current and/or scheduled maintenance on a device, such as to reflect an ability of the device to complete performance of a task by a specified completion time; a current and/or expected location of the device, such as to reflect an ability of the device to perform a task in a specified location; etc.

In addition to the operations of module 101, the LTG server 100 may further in some embodiments include one or more additional modules. In the illustrated embodiment, the additional modules include a messaging server module 105 that may be used to send messages to particular devices and/or all devices within a group, such as from the LTG server 100 and/or for a particular task, including to provide information about task performance and/or to request information related to the task performance or other activities of the device. If a device has one or more associated users, the notification module 137 may further provide notifications to the user, such as to request information from the user or to request the user to take particular actions, or to otherwise provide information about past, current and/or future task performance for the device.

In the illustrated embodiment, the additional modules may also optionally one or more other modules 109 that may be used to provide other types of functionality of interest. As one example, the other modules 109 may optionally include a user-initiated generation module that provides functionality to enable clients to initiate the generation of various types of information to be used by the LTG server 100, including related to tasks. Additional details related to modules of the LTG server system are included elsewhere herein.

It will be appreciated that various of the details provided in FIG. 1A are illustrative, and that other types of functionality may be provided in other manners in other embodiments.

Figure 1B:
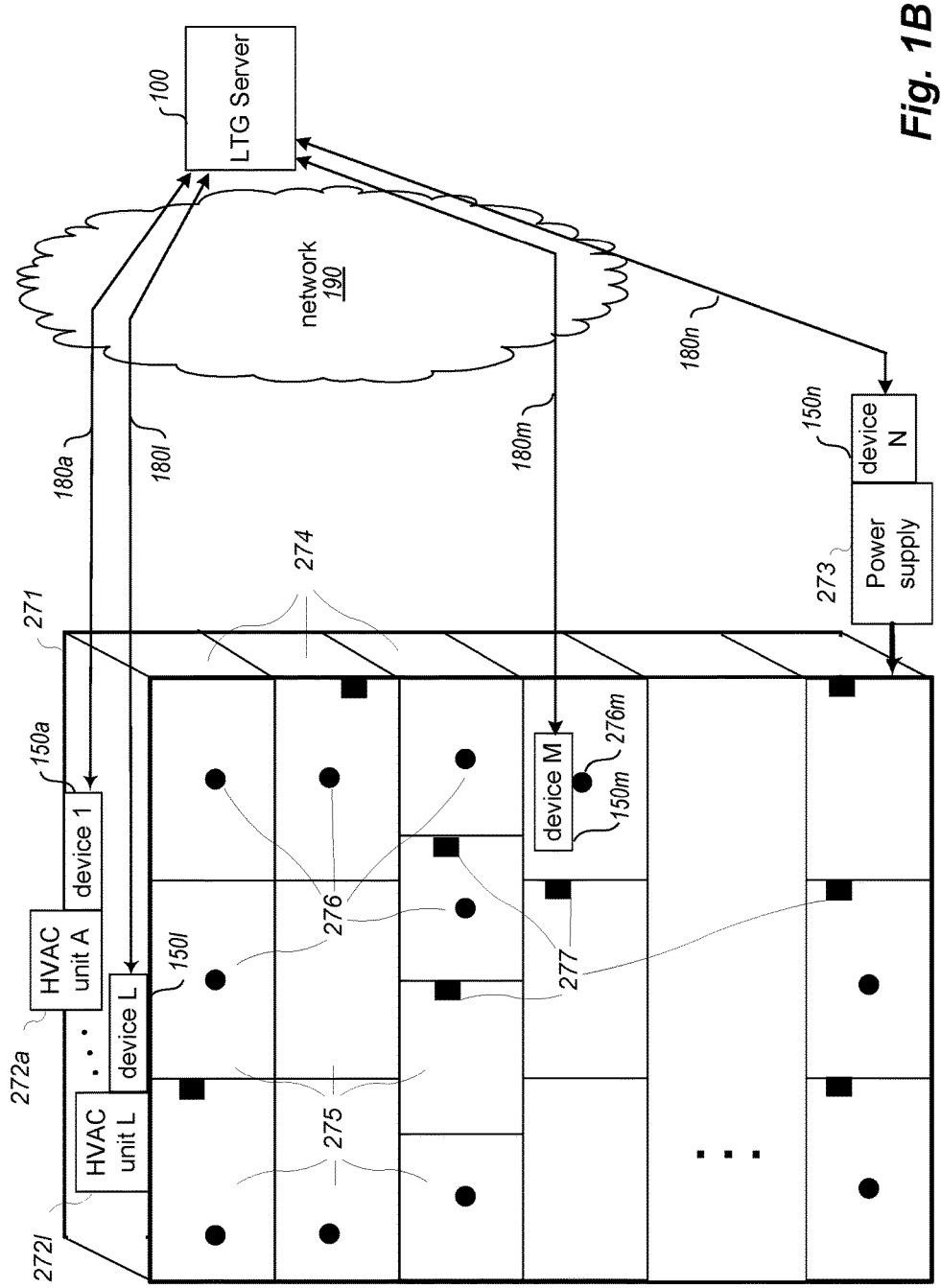

FIG. 1B continues the example of FIG. 1A, and illustrates one particular example of controlling performance of assigned tasks by devices of a group, such as in response to corresponding instructions 180 from an LTG server system 100 over one or more intervening computer networks 190. In particular, in the example of FIG. 1B, the devices 150 are associated with a building 271 and its environmental controls, including multiple HVAC units 272, sensors 276, and a power supply 273, and perform automated operations to control heating and/or cooling of the building (e.g., as part of a smart building management system). In the illustrated example, the building has multiple floors 274, with each floor having multiple rooms 275. Some rooms have temperature sensors 276 to supply temperature for that room, and some rooms (whether the same or different rooms) may have occupant-selectable instruction boxes 277 to request heating and/or cooling for one or more rooms associated with those instruction boxes. One or more of the devices of the group may be associated with one or more of the sensors, such as device M 150*m* being associated with sensor 276*m*, and may implement one or more specified operations to obtain corresponding sensor information from the building as part of performance of one or more tasks. Furthermore, other of the devices of the group may implement one or more other specified operations as part of performing one or more tasks (whether the same one or more tasks, or other inter-related tasks), such as one or more of the devices 150*a*-150*l* interacting with an associated HVAC unit 272*a*-272*l*, respectively, to cause the HVAC units to take specified actions (e.g., related to heating and/or cooling). Similarly, another device of the group may implement one or more other specified operations as part of performing one or more tasks (whether the same one or more tasks, or other inter-related tasks), such as device 150*n* interacting with the power supply 273 to cause the power supply to take specified actions (e.g., related to reducing or increasing power to specific parts of the building). In this manner, various types of tasks may be performed as part of controlling or otherwise managing operations of the environmental systems of the building. While not illustrated here, such a smart building management system may similarly have access to other operations of the building, and a group of devices (whether the same or different devices) may control other such operations, such as lights and/or water and/or elevators and/or security, etc., whether instead of or in addition to HVAC-related control. It will be appreciated that various details of this example are provided for illustrative purposes only, and that the invention is not limited to these details.

Figure 1C:
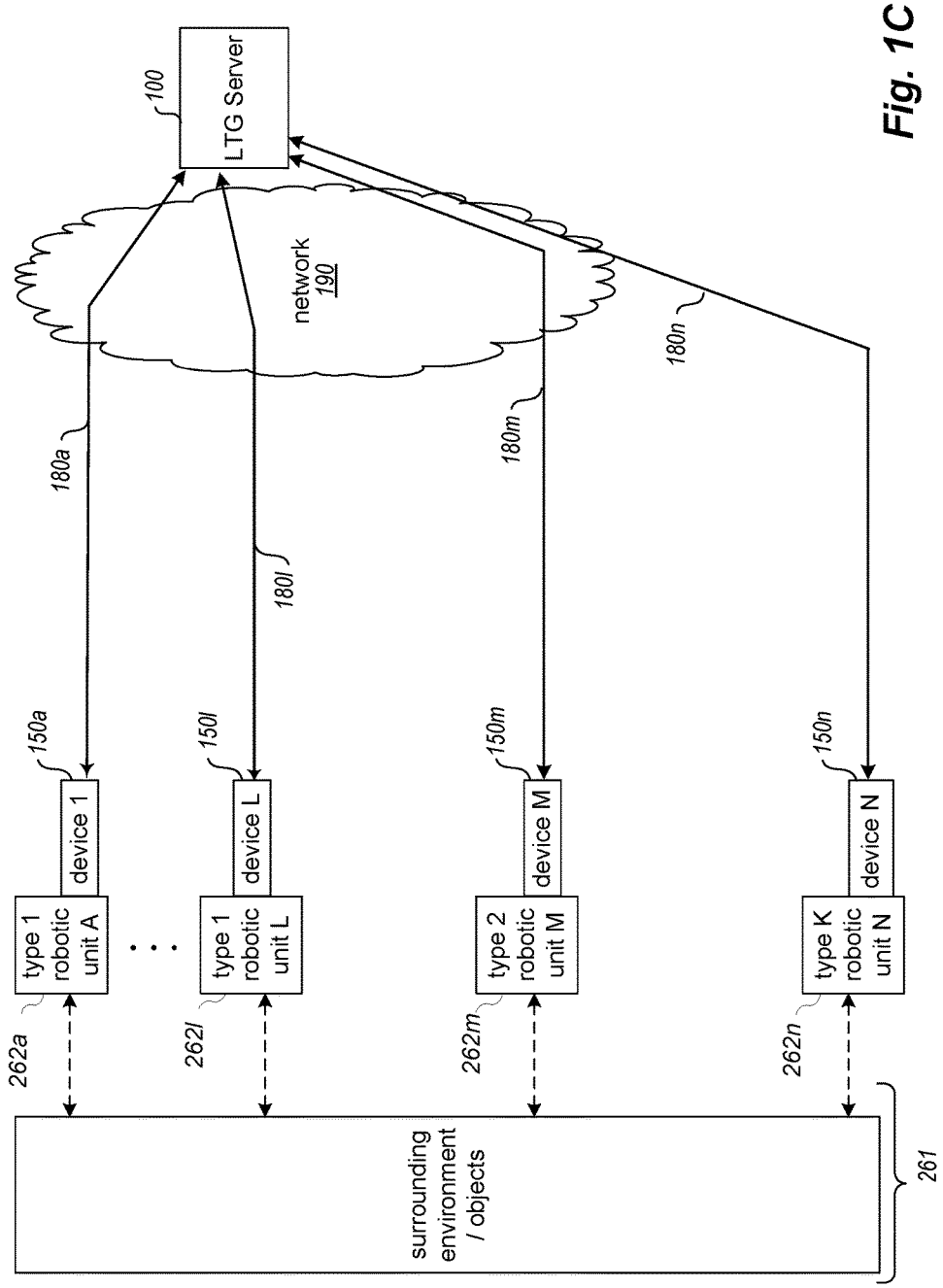

FIG. 1C continues the example of FIG. 1A, and illustrates an alternative particular example of controlling performance of assigned tasks by devices of a group, such as in response to corresponding instructions 180 from an LTG server system 100 over one or more intervening computer networks 190. In particular, in the example of FIG. 1C, the devices 150 are associated with various robotic units 262 operating in an environment 261 with corresponding objects in the environment, and perform automated operations to control at least some operations of the robotic units. In the illustrated example, each of the devices of the group is associated with one of the robotic units, such as device M 150*m* being associated with robotic unit M 262*m*, and may implement one or more specified operations as part of performance of one or more tasks to cause the robotic unit to take specified actions (e.g., related to the robotic unit moving to a particular location of the environment and/or manipulating a particular object in a particular manner). Similarly, another device of the group may implement one or more other specified operations as part of performing one or more tasks (whether the same one or more tasks, or other inter-related tasks), such as device 150*a* interacting with the robotic unit A 262*a* to cause the robotic unit to take specified actions (whether of the same or different types than the actions of robotic unit M 262*m*). In this example, the robotic units are of different types and have different capabilities, and the devices of the group may similarly be of different types and have different capabilities—if so, competitive performance of one or more tasks may provide useful information about which type of robotic unit and/or associated device best performs a specified type of operation or task, while cooperative performance of one or more tasks may use different capabilities of different robotic units and/or devices to perform different types of actions. In this manner, various types of tasks may be performed as part of controlling or otherwise managing the robotic units and the objects of the surrounding environment. It will be appreciated that various details of this example are provided for illustrative purposes only, and that the invention is not limited to these details.

Figure 1D:
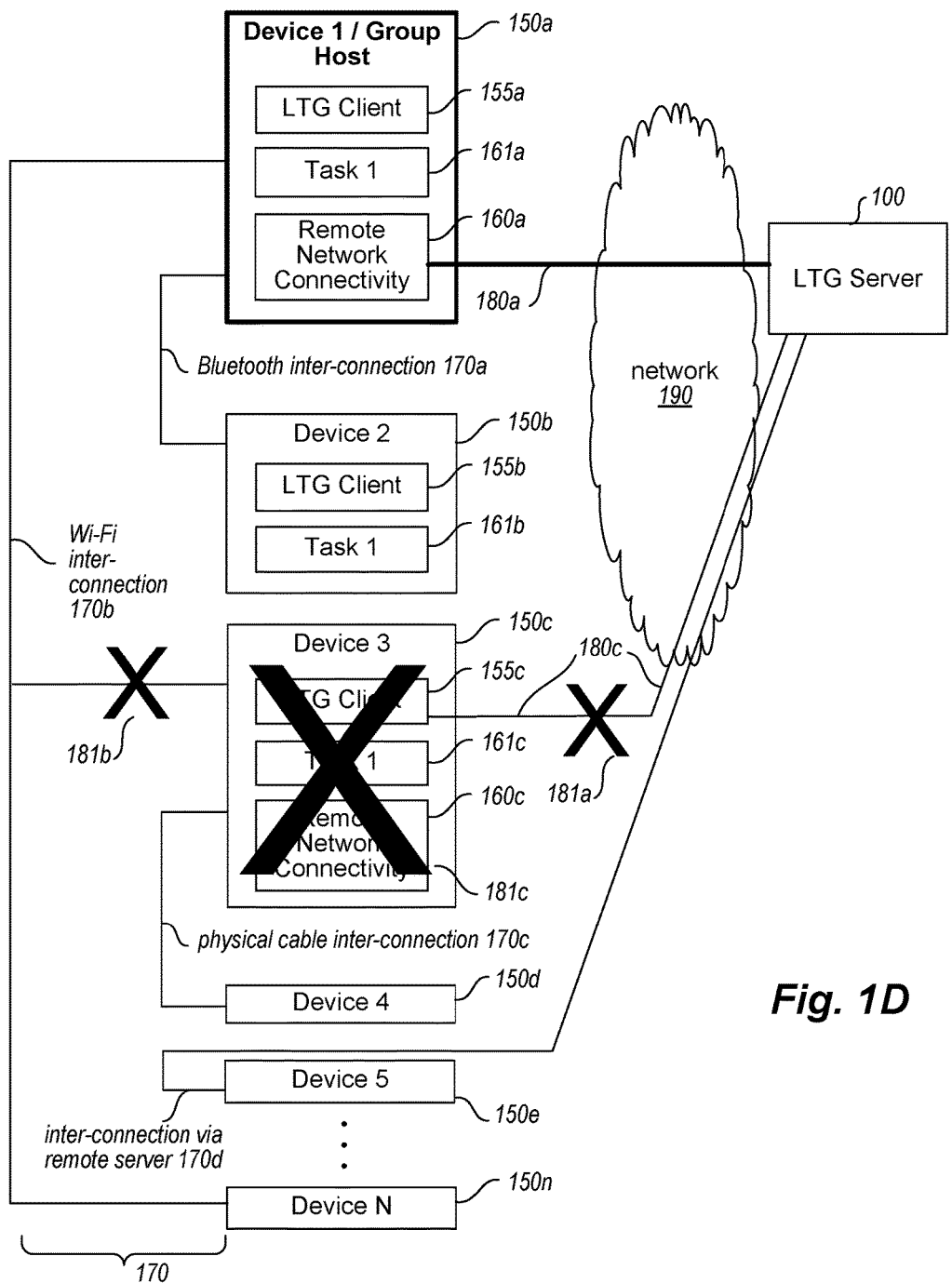

FIG. 1D continues the example of FIG. 1A, and includes additional details regarding an example of matchmaking operations that are performed to select a new host device for the group of devices based on one or more types of changes that may occur. In addition, various details are illustrated with respect to examples of inter-connections 170 that may exist between various of the devices of the group, while some details shown in FIG. 1A are not included in FIG. 1D for the sake of simplicity (e.g., information about modules and stored information of the LTG server system, other related systems, etc.).

With respect to the additional details illustrated in FIG. 1D corresponding to possible types of inter-connections 170 between the devices of the group, FIG. 1D illustrates one possible example of types of inter-connections that might be present and in use. In particular, in this example, various of the client devices include Wi-Fi-based inter-communication capabilities and are interconnected via a Wi-Fi connection 170*b*, including client devices 1, 3, and N. Furthermore, in this example, client device 2 150*b* includes inter-communication capabilities that include only use of the Bluetooth networking protocol, and thus participates in the group based on a Bluetooth-based inter-connection 170*a* between client device 2 and client device 1 150a (such as if client device 1 is the only other device of the group with Bluetooth capabilities that is within a sufficient proximity to client device 2 to enable such an inter-connection). Thus, during the time that client device 3 acts as the host for the group, group host client device 3 sends group-related communications to client device 2 through client device 1 as an intermediate pass-through device, using inter-connection 170a (and also inter-connection 170b and/or inter-connections 180a and 180c). In a somewhat analogous manner, an additional example client device 4 150d is illustrated in FIG. 1D, which in this example does not include any wireless inter-communication capabilities—instead, client device 4 participates in the group in this example via a physical cable inter-connection 170c to client device 3. Thus, during the time that client device 3 acts as the host for the group, group host client device 3 sends group-related communications to client device 4 via that physical cable for inter-connection 170c. Client device 5 150e is also newly illustrated in FIG. 1D, and in this example does not include any local wireless inter-connection capabilities such as Bluetooth or Wi-Fi, but does support remote wireless connection capabilities (e.g., via a 3G or 4G wireless cellular connection). Accordingly, in this example, client device 5 participates in the group via an inter-connection 170d using one or more remote servers (e.g., the LTG server 100) as intermediate devices, such that group host client device 3 sends group-related communications to client device 5 via the remote servers as pass-through devices. Thus, some devices may support multiple types of inter-connection capabilities (e.g., client device 1, which supports Bluetooth, Wi-Fi, and a remote network connection), while other devices may support only a single type of inter-connection capability. The various devices in this example thus interact with each other using various connection types as available, so as to form a mesh network that allows inter-communications to occur.

FIG. 1D further illustrates an example of actions that may be taken to select a new device of the group to act as the host for the group based on one or more types of changes that occur. In this example, the types of changes discussed occur with respect to the device of the group that was the current host before the changes (in this example, client device 3, as discussed with respect to FIG. 1A), although in other situations one or more types of such changes may occur with respect to one or more other devices in the group, whether instead of or in addition to the device that was the current host device before the changes.

In particular, in this example, one type of change that may occur is for the client device 3 to lose its ability to communicate with the LTG server 100, as shown by indicator 181a, such as due to a problem with transmitter hardware and/or software of client device 3, due to problems external to client device 3 (e.g., a third-party service provider that supports the remote connection 180c, such as a particular cellular telephone network provider), due to client device 3 moving to a location that lacks support for the remote connection 180c, etc. If that is the only type of change, client device 3 may continue to participate in the group via the Wi-Fi inter-connection 170b, although communications between the group and the LTG server 100 (or any other remote servers) will need to occur in a manner other than the prior connection 180c, such as to instead use connection 180a.

Another type of change that may occur is for client device 3 to lose its ability to participate in the Wi-Fi inter-connection 170b, as shown via indicator 181b, but continue to have an existing connection 180c to the LTG server 100 (e.g., due to a problem with transmitter hardware and/or software of client device 3, due to client device 3 moving to a location outside of range of inter-connection 170b, etc.). If so, client device 3 may continue to participate in the group via the remote connection 180c, in a manner similar to that described with respect to client device 5 and inter-connection 170d. In addition, with either of the changes of type 181a or 181b, if only one of the changes has occurred, client device 4 may also continue to participate in the group via the physical cable inter-connection 170c, by continuing to receive group-related communications via client device 3. Furthermore, while client device 3 continues to participate in the group, client device 3 may in some situations continue to be the group host device, while in other situations may no longer be selected as the group host after the change(s).

Yet another type of change that may occur is illustrated with indicator 181c and corresponds to client device 3 no longer participating in the group. Such a change may be caused by, for example, client device 3 having a failure or otherwise shutting down (e.g., due to a lack of sufficient battery, due to an instruction from its user, etc.). Alternatively, the change 181c may instead be caused by client device 3 leaving a geographic location used for some or all of the devices of the group, the user of client device 3 indicating to stop participating in the group, a shutdown of software module 155c on client device 3, or any other situation that causes the device to no longer be part of the group. If so, and even if one or both of connection 180c and the ability to use Wi-Fi inter-connection 170b remains, client device 3 will be removed from ongoing operations of the group. In addition, in this example, client device 4 will similarly be removed from participation in the group, since its only current connection to other devices of the group was via client device 3, although in some situations client device 4 may be able to rejoin the group if it is able to establish a new connection to one or more other devices of the group.

In this example, based on any of the changes 181a-181c occurring, matchmaking operations are performed to select a current host for the group for ongoing operations, while in other embodiments only a change of type 181c may cause such group host selection matchmaking operations to occur. While in some situations the matchmaking operations may determine to retain the same device of the group that was previously the host, in this example the matchmaking operations include selecting client device 1 to be the new host for the group for ongoing operations, such as to continue an ongoing interaction session with the LTG server 100 related to the performance of one or more specified tasks or related operations. As discussed in greater detail elsewhere, such matchmaking operations may in some embodiments and situations be performed only by the LTG server 100, may be performed by interactions of some or all of the client devices of the group, or may be based on actions of the LTG server 100 in combination with that of one or more devices 150 of the group. Furthermore, as discussed in greater detail elsewhere, one or more of a variety of factors may be used when determining to select client device 1 to act as the new group host, including the existence of its remote connection 180a to the LTG server 100 and/or other capabilities or configuration associated with client device 1.

Figure 1E:
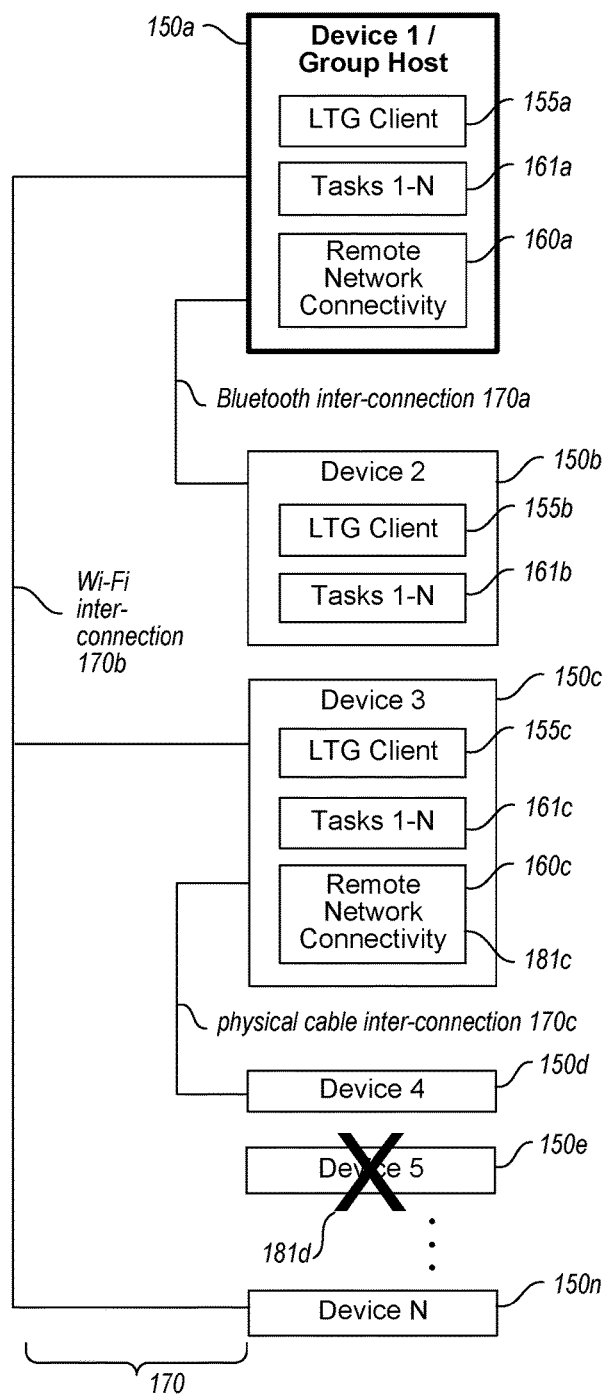

FIG. 1E continues the examples of FIGS. 1A and 1D, but provides additional details involving an embodiment in which multiple devices of the group interact without the use of any remote servers. Such a situation may occur, for example, if the group was initially interacting with LTG server 100 (e.g., being controlled by LTG server 100), such as in the examples of FIGS. 1A and 1D, and the ability to interact with the LTG server 100 is lost (e.g., the LTG server 100 is shut down or otherwise becomes unavailable, all of the remote connections via the network 190 to the LTG server 100 become unavailable, etc.). If so, the group may continue its prior operations, whether on a temporary basis until connections to the LTG server 100 are reestablished, or indefinitely. Such ongoing operations may include the previously existing host device (in this example, client device 1) taking over the prior role of the LTG server 100 in directing operations of the group, such as to provide some or all of the functionality that would previously or otherwise have been provided by the LTG server 100. Alternatively, in some embodiments and situations, such a change in the ability to interact with a remote LTG server 100 may initiate matchmaking operations in which a new host device for the group may optionally be chosen, such as based at least in part on factors other than the existence of a remote connection to the LTG server 100 that no longer exists. In yet other situations, the operation of the group without any remote servers may instead occur throughout the entire existence of the group, such as if the group was formed and operates without ever interacting with such a remote server. It is noted that in this example, if remote connections to LTG server 100 are not available, client device 5 will not be able to participate in activities of the group, since its only connection to the group previously was via such a remote connection.

FIG. 1E further illustrates an example in which the group of devices are performing multiple inter-related tasks 1-N, such as in a specified order or with other specified dependencies (not shown), and optionally with other task-related information (e.g., task priority, task completion time, etc., also not shown) being specified and used. While each of the devices are illustrated as having information 161 about all of the tasks 1-N in this example, in other embodiments and situations particular devices may have information about only a subset of the tasks, such as if the group cooperatively performs the multiple tasks in a distributed manner that involves each of the devices performing such a task subset.

It will be appreciated that various of the details provided in FIGS. 1D-1E are illustrative, and that other types of functionality may be provided in other manners in other embodiments.

Figure 2:
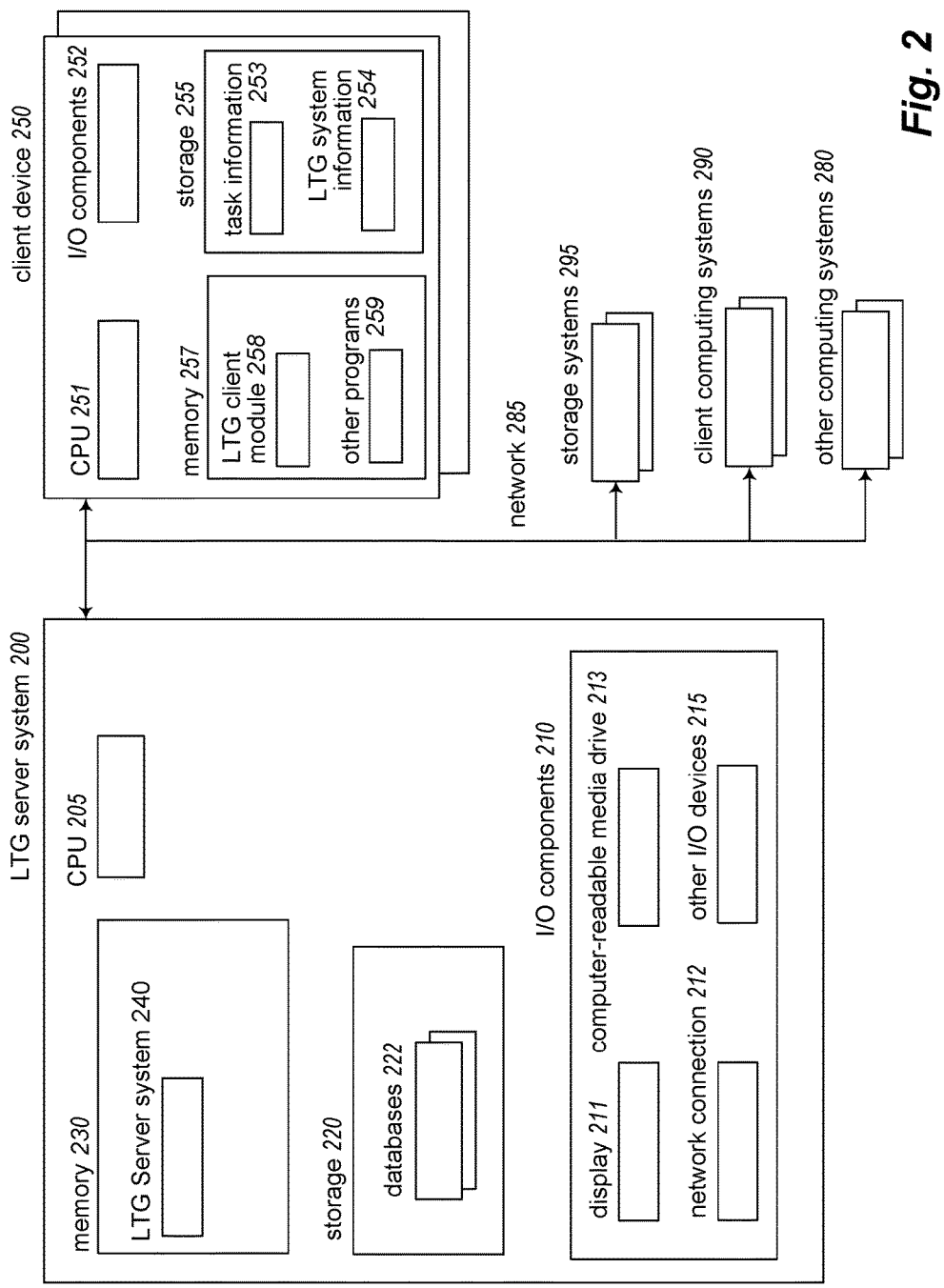
FIG. 2 is a block diagram illustrating example computing systems suitable for executing an embodiment of a system for controlling performance of assigned task(s) by devices of a group.

FIG. 2 is a block diagram illustrating example computing systems suitable for executing an embodiment of a system for controlling performance of assigned task(s) by devices of a group. In particular, FIG. 2 illustrates a Location-based Task Governor (LTG) Server system 200 suitable for executing an embodiment of a LTG Server system 240 that interacts with various client devices 250 over a network 285, such as by providing functionality of the LTG server 100 discussed with respect to FIGS. 1A-1E. The network 285 may include publicly-accessible networks such as the Internet and/or the World Wide Web, and may also include one or more private networks, such as private cellular telephone networks or private local-area networks ("LANs"). While not illustrated here, in some embodiments the server system 200 may include multiple computing systems, some or all of which may be co-located or otherwise associated, while others of which may be located remotely from other such computing systems. In addition, while not illustrated here, various modules of the LTG Server system 240 may be present and used in at least some embodiments, as discussed with respect to FIG. 1A and elsewhere.

In the illustrated embodiment, the LTG server system 200 has components that include one or more hardware processors 205 (e.g., CPUs, or central processing units), various I/O components 210, storage 220, and memory 230. The illustrated I/O components include a display 211, a network connection 212, a computer-readable media drive 213, and other I/O devices 215 (e.g., a keyboard, a mouse, speakers, microphone, etc.). In addition, the client devices 250, client computing systems 290, storage systems 295 and/or other computing systems 280 may also each include similar components to some or all of the components illustrated with respect to server system 200, but at least some such components are not illustrated in this example for the sake of brevity. For example, the illustrated client devices 250 may each have one or more hardware processors 251, I/O components 252, storage 255, and memory 257, with the illustrated embodiment of the storage 255 including task information 253 (e.g., for one or more current, scheduled and/or past tasks) and other LTG system information 254 (e.g., evaluated performance scores for the current device and/or other devices, other LTG system information for the current device and/or other devices, etc.). In the illustrated embodiment, a client LTG software module 258 is executing in memory 257, along with one or more optional other programs 259 (e.g., programs to be executed as part of performing one or more specified types of operations for one or more tasks being performed).

An embodiment of a LTG Server system 240 is executing in memory 230, and it interacts with client devices 250 and client computing systems 290, and optionally other computing systems 280 and/or storage systems 295 over one or more of the networks 285. The other computing systems 280 may, for example, provide tasks and/or other functionality for the LTG Server system and/or the devices 250. The system 240 may create and/or use various information during operation, such as information 121-130 of FIG. 1A, which may be stored in one or more database data structures 222 on storage 220 and/or on one or more remote storage systems 295. The system 240 may include various software instructions that are executed by the system 200, such as to program or otherwise configure the CPU processor(s) 205 to perform particular functionality of the described techniques. Similarly, the module 258 may include various software instructions that are executed by each of the devices 250, such as to program or otherwise configure the CPU processor(s) 251 to perform particular functionality of the described techniques. In some embodiments, client computing systems 290 may similarly each execute software (e.g., a client-side component of the LTG Server system 240) that program or otherwise configure the CPU processor(s) of those client computing systems to perform particular functionality of the described techniques.

It will be appreciated that computing systems 200, 290 and 280, devices 250 and storage systems 295 are merely illustrative and are not intended to limit the scope of the present invention. The systems and/or devices may instead each include multiple interacting computing systems or devices, and may be connected to other devices that are not illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated LTG Server system 240 may in some embodiments be distributed in various modules. Similarly, in some embodiments, some of the functionality of the LTG Server system 240 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the LTG Server system and/or LTG client software) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

In some embodiments, the described techniques further include coordinating the inter-connection of multiple devices in particular manners, such as for multiple devices of multiple distinct types, and optionally using multiple different types of inter-connections. As one illustrative example, first and second mobile devices of different first and second types may be inter-connected using a first local wireless networking protocol (e.g., Bluetooth), the second device may be interconnected with a distinct third mobile device of a third type using a distinct second local wireless networking protocol (e.g., Wi-Fi), and the third mobile device may be inter-connected with one or more fourth remote server computing systems using a distinct third remote networking protocol (e.g., 3G wireless or 4G wireless using one of various underlying implementation technologies; WiMAX; etc.). To continue the illustrative example, functionality that is available from the fourth remote server computing systems may be provided to a group of some or all of the first, second and third mobile devices via the connection between the third mobile device and the fourth remote server computing systems, and the other inter-connections between the mobile devices of the group. Accordingly, to support this illustrative example, the described techniques may in some embodiments include coordinating the inter-connections between the mobile devices of the group and/or the fourth remote server computing systems in various manners, such as by selecting a particular type of inter-connection to use between two devices or systems when multiple alternatives are available, selecting one or more particular mobile devices to perform a particular type of operation on behalf of the group and/or provide a particular type of functionality to the group, etc. Additional details related to coordinating inter-connections between mobile devices of a group and/or other remote computing systems are included herein, and examples of such inter-connections are further described in provisional U.S. Patent Application No. 61/580,615, filed Dec. 27, 2011 and entitled "Distributed Functionality On Mobile Devices," which is hereby incorporated by reference in its entirety. Furthermore, additional details related to assigning and evaluating tasks assigned to devices and/or their users are included in the following, each of which is hereby incorporated by reference in its entirety: U.S. Provisional Patent Application No. 61/616,340, filed Mar. 27, 2012 and entitled "Location-Based Task And Game Functionality" (referred to herein as the "'340 application"); U.S. patent application Ser. No. 13/843,804, filed Mar. 15, 2013 and entitled "Location-Based Task And Game Functionality" (referred to herein as the "'804 application"), which claims the benefit of the '340 application; in International Application No. PCT/US2013/034175, filed Mar. 27, 2013 and entitled "Location-Based Task And Game Functionality" (referred to herein as the "'175 application"), which claims the benefit of the '340 and '804 applications; in U.S. patent application Ser. No. 14/498,767, filed Sep. 26, 2014 and entitled "Location-Based Task And Game Functionality" (referred to herein as the "'767 application"), which claims the benefit of the '340 application and is a continuation of the '175 application and is a continuation-in-part of the '804 application.

The described techniques include performing matchmaking operations in at least some embodiments to determine whether and/or how a group of multiple inter-connected mobile devices will provide functionality to each other and/or will access functionality from one or more remote server computing systems, including to select a host mobile device for the group, such as from multiple candidate mobile devices within the group. The host mobile device may in some embodiments and situations host various functionality that is made available to other mobile devices of the group, such as with respect to an application that is being executed (e.g., as part of performing one or more tasks or otherwise implementing one or more operations) and/or used in a distributed and coordinated manner by the mobile devices of the group—such situations may include those in which a connection to remote server computing systems is not currently available or in use, and the host mobile device may be selected from multiple candidate mobile devices within the group that are options for hosting the functionality for the group. In addition, the host mobile device may in some embodiments and situations provide a connection to one or more particular remote server computing systems, such as to enable functionality to be provided to the mobile devices of the group corresponding to an application that is being executed and/or used in a distributed and coordinated manner by the mobile devices of the group—in such situations, the host mobile device may be selected from multiple candidate mobile devices within the group that are options for providing such a connection. If a connection to the remote server computing system is not currently available or in use, the host mobile device may attempt to provide some or all of the functionality that would otherwise have been provided by the remote server computing system with respect to providing distributed functionality to the mobile devices of the group, such as by using information that is stored locally to the host mobile device or that is otherwise accessible to the host mobile device (e.g., is stored on one or more other mobile devices of the group). The matchmaking operations may include considering one or more of a variety of factors when selecting a particular host, such as factors corresponding to the mobile devices that are part of the group, to the users associated with those mobile devices, and/or to the tasks being performed. In addition, in some embodiments and situations, multiple host mobile devices may be selected for a particular group to provide distributed functionality for an application to the mobile devices of the group, such as to operate together in a distributed manner, or instead at different times or in different roles.

Figure 3A:
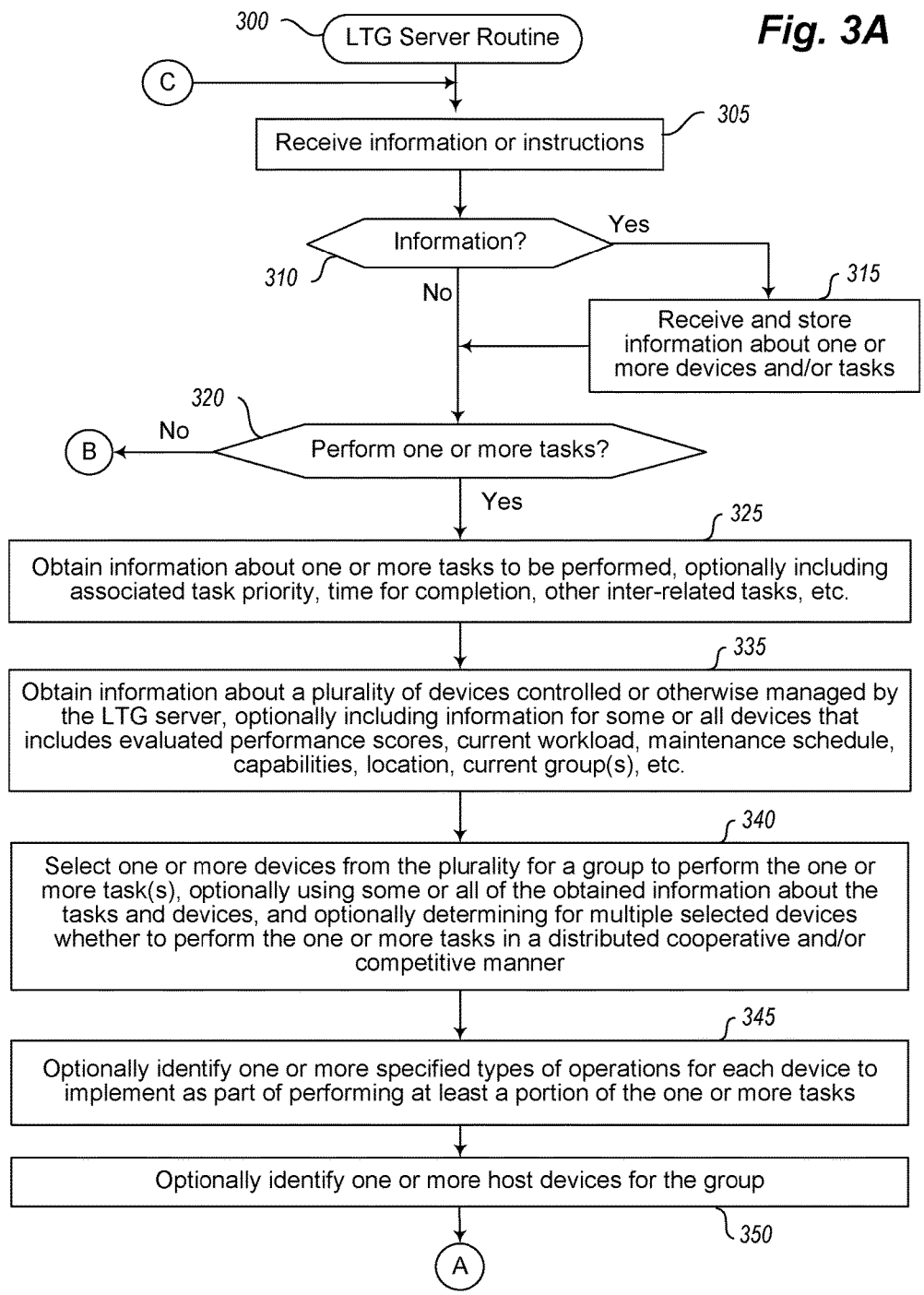

FIGS. 3A-3B are a flow diagram of an example embodiment of an LTG Server routine 300. The routine may be performed by, for example, the LTG Server systems 100 and/or 105 of FIG. 1A-1E and/or the LTG Server system 240 of FIG. 2, such as to perform various activities related to controlling distributed operations of devices to perform assigned tasks.

The illustrated embodiment of the routine 300 begins at block 305, where information or instructions are received. It will be appreciated that such information or instructions, including to reflect a determination to perform a particular activity, may be received in various manners, such as based on periodic processing such as by the LTG Server system, based on a request from a client and/or operator of the LTG Server system, based on information received from one or more devices being managed by the LTG Server system, based on other information received or other determinations made by the LTG Server system, etc. After block 305, the routine continues to block 310 to determine if information has been received to be stored for later use, such as from one or more managed devices (e.g., related to task performance, device status, group status, etc.). If so, the routine continues to block 315 to store the information for later use. The information obtained in block 315 may be stored in various manners, including as discussed elsewhere herein, such as with respect to stored data 121-130 and database storage 260 illustrated in FIGS. 1A and 2.

After block 315, or if it is instead determined in block 310 that the information or instructions received in block 305 do not include information to be stored, the routine continues to block 320 to determine whether to have one or more devices perform one or more tasks, such as based on task information received from a client, tasks previously scheduled for performance, one or more events that trigger task performance (including in some situations based on information just received and stored with respect to block 315), etc. If so, the routine continues to block 325 to obtain information about the one or more tasks, including to optionally obtain information about specified task priority, time for completion, dependencies or other inter-relationships with other tasks, etc. After block 325, the routine continues to block 335 to obtain current information about some or all of a plurality of devices that are controlled or otherwise managed by the LTG Server system, including to optionally obtain information for some or all devices about evaluated performance scores, current workload, maintenance schedule, capabilities, location, current groups to which devices belong, etc. In block 340, the routine then selects one or more devices from the plurality to be part of a group to perform the one or more tasks, optionally using some or all of the obtained information about the tasks and devices. In some embodiments, the performance of all tasks by multiple devices of a group may be performed in a distributed cooperative manner among those devices, in other embodiments the performance of all tasks by multiple devices of a group may be performed in a distributed competitive manner among those devices, and in yet other embodiments a determination may be made for a particular task of whether to perform it in a competitive or cooperative manner (or more generally how the task(s) may be performed by the selected devices of the group), such as based on a type of the task(s), on information specified by a client that requests or otherwise specifies the task, as part of automated operations of the LTG Server system to evaluate performance of devices under different conditions, etc.

After block 340, the routine continues to block 345 to optionally identify one or more specified types of operations for one or more of the selected devices to implement as part of performing at least a portion of the one or more tasks to be performed. In block 350, the routine then optionally identifies one or more host devices for the group, although in other embodiments a host device may not be identified—the host device identification may be performed in various manners, including by the devices of the group or by the LTG Server system based on one or more of various factors, as discussed in greater detail elsewhere herein. After block 350, the routine continues to block 355 to initiate the task performance by the selected devices of the group, including to send information to at least one device of the group (e.g., a host device, all devices, etc.) about the one or more tasks and/or the one or more specified operations.

After block 355, the routine obtains information in block 360 about the performance of the one or more tasks by the devices of the group, and uses the information to generate performance evaluation scores for each of the devices (optionally along with other information, such as previous task performance information). While block 360 is illustrated as occurring immediately after block 355, it will be appreciated that a significant amount of time may pass between blocks 355 and 360 for at least some types of tasks and in at least some situations, and that the routine may be concurrently performing other operations (e.g., managing other task performance on other devices) during the time in an asynchronous manner. After block 360, the routine may optionally select one or more devices to be primary devices for future tasks corresponding to the one or more tasks that were performed (e.g., the same tasks, tasks of the same type, etc.), such as to select one or more devices of the group having the highest performance evaluation scores. The routine may further optionally send generated performance evaluation scores and/or other LTG server system information (e.g., about tasks, devices, etc.) in block 370 to some or all devices managed by the system, such as to enable devices to operate locally without access to the centralized LTG Server system.

After block 370, or if it is instead determined in block 320 that the information or request received in block 305 is not related to performing one or more tasks, the routine continues to block 375 to determine whether the information or request received in block 305 is related to updating group information, and if so continues to block 380 to perform corresponding operations to update group membership or other information about one or more groups. For example, a group of devices may change between being controlled by the centralized LTG Server system and performing local control within the group in various circumstances, and/or may have one or more devices leave or join the group, and if so the routine 300 may receive corresponding information from the group(s) and/or device(s) or may otherwise determine such changes (e.g., due to a connection being lost with a host device of a group, due to an inability to communicate with one or more devices for a defined period of time, etc.). As discussed in greater detail elsewhere, the centralized LTG Server routine may select a host device for a group in some embodiments and situations, including to potentially select a new host device for a group in block 380 if the previous host device becomes unavailable or other circumstances warrant the change.

If it is instead determined in block 375 that the information or request received in block 305 is not to update group information, the routine continues instead to block 390 to perform one or more other indicated operations as appropriate. Such other operations may include, for example, registering devices and/or storing information about them (e.g., their capabilities), registering clients and/or storing information about them (e.g., preferences), receiving and storing information about tasks to be performed in the future (e.g., periodically or otherwise at scheduled times, when specified criteria are satisfied, etc.), monitoring for the satisfaction of specified criteria (e.g., to trigger performance of tasks or other activities), etc.

After blocks 380 or 390, the routine continues to 395 to determine whether to continue, such as until an explicit indication to terminate is received. If it is determined to continue, the routine returns to block 305, and otherwise continues to block 399 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A computer-implemented method comprising:
   receiving, by one or more computing systems of a centralized server system that manages operations of a plurality of controller devices in multiple geographical locations, information about the plurality of controller devices that includes workload information indicating current loads of the plurality of controller devices, wherein each controller device controls an associated mechanical system and has capabilities to receive and implement instructions to perform multiple types of actions to modify operations of the associated mechanical system;
   receiving, by the one or more computing systems, a request to perform a specified task that involves manipulating an environment in one of the multiple geographical locations, the specified task having a specified priority and a specified time for completion;
   selecting, by the one or more computing systems, and in response to the received request, a group of devices to implement a specified type of operation associated with performing the specified task, wherein the group of devices includes multiple controller devices of the plurality, and wherein the selecting is based at least in part on the current loads of the multiple controller devices enabling the multiple controller devices to complete the specified type of operation by the specified time for completion at the specified priority;
   sending, by the one or more computing systems and to each of the multiple controller devices, first instructions over one or more computer networks to control the mechanical system associated with the controller device to perform the specified type of operation;
   evaluating, by the one or more computing systems, performance of each of the multiple controller devices for the specified type of operation, including scoring the performance of each controller device according to one or more specified criteria;
   determining, by the one or more computing systems, one or more of the multiple controller devices to be primary devices for performing future operations of the specified type based at least in part on the evaluated performance of the one or more controller devices; and
   in response to a subsequent request to perform the specified type of operation, sending, by the one or more computing systems and to each of the primary devices, additional instructions to perform the specified type of operation to control the mechanical system associated with the primary device, wherein the sending of the additional instructions is performed without sending the second instructions to other controller devices of the multiple controller devices that are not the primary devices.

2. The computer-implemented method of claim 1 wherein the mechanical systems associated with the multiple controller devices are part of mobile robots each having one or more mechanical actuators to manipulate a surrounding environment, and wherein sending of the first instructions to a controller device to perform the specified type of operation includes causing the controller device to issue one or more commands to one of the mobile robots to use at least one mechanical actuator of the one robot to manipulate the surrounding environment to accomplish a task associated with the specified type of operation.

3. The computer-implemented method of claim 2 wherein the specified task is one of a plurality of inter-related tasks that are to be performed in a specified order and that include at least one task to be performed after successful completion of at least one other task, wherein the selecting of the group of devices to implement the specified type of operation further includes identifying the multiple controller devices as having capacity to cooperatively accomplish the plurality of inter-related tasks in a distributed manner by each performing a subset of the plurality of inter-related tasks, wherein the sending of the first instructions are further to cooperatively accomplish the plurality of inter-related tasks, and wherein the evaluating of the performance of a controller device in performing the specified type of operation includes evaluating a contribution of the controller device and an associated mobile robot in contributing to the cooperative accomplishment of the plurality of inter-related tasks.

4. The computer-implemented method of claim 1 wherein the mechanical systems associated with the multiple controller devices include environmental sensors and environmental controls for an interior of a building, and wherein sending of the first instructions to a controller device to perform the specified type of operation includes causing the controller device to obtain information from at least one environmental sensor and to issue one or more commands to at least one environmental control to manipulate the environment within the interior of the building to accomplish a task associated with the specified type of operation.

5. The computer-implemented method of claim 4 wherein the selecting of the group of devices to implement the specified type of operation includes selecting the multiple controller devices to cooperatively accomplish the task in a distributed manner by each performing a subset of the task, and wherein the evaluating of the performance of a controller device in performing the specified type of operation includes evaluating a contribution of the controller device and an associated environmental control in contributing to the cooperative accomplishment of the task.

6. The computer-implemented method of claim 1 wherein a mechanical system associated with a first controller device of the multiple controller devices is part of a mobile device, and wherein the sending of the first instructions includes causing the first controller device to issue one or more commands to the mobile device to manipulate the environment to accomplish the specified task.

7. The computer-implemented method of claim 1 wherein a mechanical system associated with a first controller device of the multiple controller devices has environmental controls for an interior of a building, and wherein the sending of the first instructions includes causing the first controller device to modify at least one of the environmental controls to manipulate the environment to accomplish the specified task.

8. The computer-implemented method of claim 1 wherein the plurality of controller devices are associated with multiple mechanical systems that are of multiple types and have different types of mechanical components, and wherein the evaluating of the performance of each of the multiple controller devices includes evaluating performance of the mechanical system associated with the controller device in using mechanical components to accomplish the specified task.

9. The computer-implemented method of claim 1 wherein the plurality of controller devices are of multiple types and have different types of capabilities, and wherein the evaluating of the performance of a controller device includes evaluating use of capabilities of the controller device to accomplish the specified task.

10. The computer-implemented method of claim 1 wherein the selecting of the group of devices includes sending a query to the plurality of controller devices to identify controller devices having capabilities to implement the specified type of operation, receiving responses to the sent query from at least some of the plurality of controller devices, and selecting the multiple controller devices for the group of devices based at least in part on the received responses.

11. The computer-implemented method of claim 1 wherein the selecting of the group of devices includes retrieving information about historical performance of at least some of the plurality of controller devices and using the retrieved information as part of the selecting.

12. The computer-implemented method of claim 1 wherein the selecting of the group of devices includes retrieving information about scheduled maintenance for at least some of the plurality of controller devices and using the retrieved information as part of the selecting.

13. The computer-implemented method of claim 1 wherein the selecting of the multiple controller devices for the group of devices is further based at least in part on the multiple controller devices being in the one geographical location.

14. The computer-implemented method of claim 1 further comprising determining to use the multiple controller devices for the group based at least in part on the specified priority of the specified task being higher than other priorities of other tasks available for at least some of the multiple controller devices.

15. The computer-implemented method of claim 14 wherein the multiple controller devices are performing the other tasks at a time of the selecting of the group of devices, and wherein the sending of the first instructions includes instructing the multiple controller devices to, based at least in part on the specified priority of the specified task being higher than the other priorities of the other tasks, perform the specified task rather than the other tasks.

16. The computer-implemented method of claim 1 wherein the receiving of the request includes receiving information indicating that the specified task is one of a plurality of inter-related tasks to be performed in a specified order involving at least one task of the inter-related tasks being performed after successful completion of at least one other task of the inter-related tasks, and wherein the selecting of the group of devices further includes determining to use the multiple controller devices to perform the plurality of inter-related tasks based at least in part on the multiple controller devices having capacity to perform the plurality of inter-related tasks.

17. The computer-implemented method of claim 16 wherein the sending of the first instructions includes instructing the multiple controller devices to perform the plurality of inter-related tasks in the specified order.

18. The computer-implemented method of claim 1 further comprising:
receiving, by one or more of the multiple controller devices, the sent first instructions;
implementing, by the one or more controller devices, the specified type of operation; and
providing, by at least one of the one or more controller devices, information to the centralized server system about implementing of the specified type of operation.

19. The computer-implemented method of claim 1 further comprising selecting one of the multiple controller devices to act as a host device for the group of devices and to communicate with the centralized server system over at least one network connection.

20. The computer-implemented method of claim 1 wherein the scoring of the performance of each of the multiple controller devices includes generating performance scores for the multiple controller devices, and wherein the method further comprises:
storing, by the one or more computing systems, the generated performance scores for the multiple controller devices, for use in first subsequent automated decisions by the centralized server system involving the multiple controller devices based at least in part on the generated performance scores; and
sending, by the one or more computing systems, information about the generated performance scores to each of the plurality of controller devices, to enable any of the plurality of controller devices to make second subsequent automated decisions involving the multiple controller devices based at least in part on the generated performance scores.

21. The computer-implemented method of claim 1 wherein the evaluating and the determining and the sending of the additional instructions are performed repeatedly to iteratively identify one or more controller devices that have highest evaluations of performance after a plurality of performances of the specified type of operation, and wherein the method further comprises sending further instructions to the identified one or more controller devices to perform further operations of the specified type.

22. The computer-implemented method of claim 1 wherein the sending of the first instructions includes instructing at least one controller device of the multiple controller devices to perform the controlling of the mechanical system associated with the at least one control device by manipulating one or more actuators of the mechanical system associated with the at least one control device.

23. The computer-implemented method of claim 1 wherein the sending of the first instructions includes instructing at least one controller device of the multiple controller devices to perform the controlling of the mechanical system associated with the at least one control device to establish one or more environmental conditions.

24. The computer-implemented method of claim 1 wherein the sending of the first instructions includes instructing at least one controller device of the multiple controller devices to perform the controlling of the mechanical system associated with the at least one control device to identify a location of an indicated object.

25. The computer-implemented method of claim 1 wherein the sending of the first instructions includes instructing at least one controller device of the multiple controller devices to perform the controlling of the mechanical system associated with the at least one control device to provide network connectivity to an indicated device.

26. The computer-implemented method of claim 1 wherein the sending of the first instructions includes instructing at least one controller device of the multiple controller devices to perform the controlling of the mechanical system associated with the at least one control device to provide a mesh of an indicated functionality over a specified area.

27. The computer-implemented method of claim 1 wherein the sending of the first instructions includes instructing at least one controller device of the multiple controller devices to perform the controlling of the mechanical system associated with the at least one control device to obtain sensor information of a specified type.

28. The computer-implemented method of claim 1 wherein the sending of the first instructions includes instructing at least one controller device of the multiple controller devices to perform the controlling of the mechanical system associated with the at least one control device to control at least one of lighting, water, security or an elevator.

29. A non-transitory computer-readable medium having stored contents that cause one or more computing systems of a centralized server system, which manages operations of a plurality of controller devices in multiple geographical locations, to perform automated operations including at least:
receiving, by the one or more computing systems, information about the plurality of controller devices that includes workload information indicating current loads of the plurality of controller devices, wherein each controller device controls an associated mechanical system and has capabilities to receive and implement instructions to perform multiple types of actions to modify operations of the associated mechanical system;
receiving, by the one or more computing systems, a request to perform a specified task that involves manipulating an environment in one of the multiple geographical locations with a specified priority and by a specified time for completion;
selecting, by the one or more computing systems, and in response to the received request, a group of devices to implement a specified type of operation associated with performing the specified task, wherein the group of devices includes multiple controller devices of the plurality, and wherein the selecting is based at least in part on the current loads of the multiple controller devices enabling the multiple controller devices to complete the specified type of operation by the specified time for completion and for the specified priority;
sending, by the one or more computing systems and to each of the multiple controller devices, first instructions over one or more computer networks to control the mechanical system associated with the controller device to perform the specified type of operation;
evaluating, by the one or more computing systems, performance of each of the multiple controller devices for the specified type of operation, including scoring the performance of each controller device according to one or more specified criteria;
determining, by the one or more computing systems, one or more of the multiple controller devices to be primary devices for performing future operations of the specified type based at least in part on the evaluated performance of the one or more controller devices; and in response to a subsequent request to perform the specified type of operation, sending, by the one or more computing systems and to each of the primary devices, additional instructions to perform the specified type of operation to control the mechanical system associated with the primary device, wherein the sending of the additional instructions is performed without sending the second instructions to other controller devices of the multiple controller devices that are not the primary devices.

30. A system comprising:

one or more hardware processors of one or more computing systems that are part of a centralized server system managing operations of a plurality of controller devices in multiple geographical locations; and one or more memories with stored instructions that, when executed by at least one of the one or more hardware processors, cause the system to perform automated operations including at least:

receiving information about the plurality of controller devices that includes workload information indicating current loads of the plurality of controller devices, wherein each controller device controls an associated mechanical system and has capabilities to receive and implement instructions to perform multiple types of actions to modify operations of the associated mechanical system;

receiving a request to perform a specified task that involves manipulating an environment in one of the multiple geographical locations with a specified priority and by a specified time for completion;

selecting, in response to the received request, a group of devices to implement a specified type of operation associated with performing the specified task, wherein the group of devices includes multiple controller devices of the plurality, and wherein the selecting is based at least in part on the current loads of the multiple controller devices enabling the multiple controller devices to complete the specified type of operation by the specified time for completion and for the specified priority;

sending, to each of the multiple controller devices, first instructions over one or more computer networks to control the mechanical system associated with the controller device to perform the specified type of operation;

evaluating performance of each of the multiple controller devices for the specified type of operation, including scoring the performance of each controller device according to one or more specified criteria;

determining one or more of the multiple controller devices to be primary devices for performing future operations of the specified type based at least in part on the evaluated performance of the one or more controller devices; and in response to a subsequent request to perform the specified type of operation, sending, to each of the primary devices, additional instructions to perform the specified type of operation to control the mechanical system associated with the primary device, wherein the sending of the additional instructions is performed without sending the second instructions to other controller devices of the multiple controller devices that are not the primary devices.

* * * * *